US012739589B2

(12) United States Patent
Magariyachi

(10) Patent No.: US 12,739,589 B2
(45) Date of Patent: Sep. 15, 2026

(54) INFORMATION PROCESSING DEVICE, INFORMATION PROCESSING METHOD, AND INFORMATION PROCESSING SYSTEM

(71) Applicant: SONY GROUP CORPORATION, Tokyo (JP)

(72) Inventor: Tetsu Magariyachi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 178 days.

(21) Appl. No.: 18/558,230

(22) PCT Filed: Feb. 22, 2022

(86) PCT No.: PCT/JP2022/007147
§ 371 (c)(1),
(2) Date: Oct. 31, 2023

(87) PCT Pub. No.: WO2022/249594
PCT Pub. Date: Dec. 1, 2022

(65) Prior Publication Data

US 2024/0223990 A1 Jul. 4, 2024

(30) Foreign Application Priority Data

May 24, 2021 (JP) ................................ 2021-087227

(51) Int. Cl.
*H04S 7/00* (2006.01)
*H04S 1/00* (2006.01)

(52) U.S. Cl.
CPC .............. *H04S 7/304* (2013.01); *H04S 1/007* (2013.01); *H04S 2400/01* (2013.01); *H04S 2420/01* (2013.01)

(58) Field of Classification Search
CPC ...... H04S 7/304; H04S 1/007; H04S 2400/01; H04S 2420/01
(Continued)

(56) References Cited

U.S. PATENT DOCUMENTS

2018/0359594 A1* 12/2018 Maeno .................... H04R 5/02
2020/0245092 A1* 7/2020 Badhwar ................ H04L 67/10

FOREIGN PATENT DOCUMENTS

JP 2009-303021 A 12/2009
JP 2014-131140 A 7/2014
(Continued)

OTHER PUBLICATIONS

International Search Report and Written Opinion of PCT Application No. PCT/JP2022/007147, issued on Apr. 26, 2022, 09 pages of ISRWO.

*Primary Examiner* — Paul Kim
(74) *Attorney, Agent, or Firm* — CHIP LAW GROUP

(57) ABSTRACT

Provided is an information processing device according to an aspect of the present disclosure, a first acquisition unit acquires head rotation information of a user. A transmission unit transmits the head rotation information to a cloud system. A second acquisition unit acquires content information to be presented to the user and meta information accompanying the content information, the content information being generated by predetermined processing performed by the cloud system using the head rotation information. A correction unit corrects, based on the meta information, a presentation position of a content reproduced by the content information.

13 Claims, 13 Drawing Sheets

(58) Field of Classification Search
USPC .......................................................... 381/310
See application file for complete search history.

(56) References Cited

FOREIGN PATENT DOCUMENTS

| | | | |
|---|---|---|---|
| WO | 2013/105413 | A1 | 7/2013 |
| WO | 2017/098949 | A1 | 6/2017 |

* cited by examiner

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2022/007147 filed on Feb. 22, 2022, which claims priority benefit of Japanese Patent Application No. JP 2021-087227 filed in the Japan Patent Office on May 24, 2021. Each of the above-referenced applications is hereby incorporated herein by reference in its entirety.

FIELD

The present disclosure relates to an information processing device, an information processing method, an information processing program, and an information processing system.

BACKGROUND

Conventionally, a field of so-called XR such as virtual reality (VR) and augmented reality (AR) uses a binaural signal reproduction technology in which a movement of the head of a listener is tracked and a virtual sound source or a virtual speaker is reproduced so as to be localized in a space where the listener is present. The binaural signal reproduction technology is one of stereophonic sound technologies also referred to as a virtual auditory display (VAD).

In relation to the binaural reproduction technology, proposed is a technology in which control points are arranged and set so that the vicinity of both ears of a listener is included in a control area of a control sound according to rotation of the head of the listener, and the control sound obtained by performing conversion processing on an original sound output from a sound source is output to the listener as an audible sound.

CITATION LIST

Patent Literature

Patent Literature 1: JP 2009-303021 A

SUMMARY

Technical Problem

However, in the conventional technology, there is a possibility that reproduction of a sound field feeling which is aimed at by a content for XR becomes difficult as XR devices such as a mobile device and a wearable device used in the field of XR are reduced in size and weight.

Specifically, in the field of XR, it is predicted that production of a large-capacity content for XR (hereinafter, the content is referred to as an "XR content") adapted to a next-generation communication standard will proceed. In addition, in order to maintain a high realistic feeling, the processing of the XR content is desirably executed in a cloud environment rather than a local environment in which a calculation resource can be limited due to reduction in size and weight. However, in such a case, due to a communication delay between the XR device and the cloud, for example, a state in which it is difficult to follow a situation in the local environment, such as a situation in which the cloud side cannot cope with a sudden movement of the head of a user wearing a wearable device, may occur. When such a situation occurs, it becomes difficult to reproduce a sound field feeling aimed at by the XR content.

Therefore, the present disclosure proposes an information processing device, an information processing method, an information processing program, and an information processing system capable of reproducing a sound field feeling aimed at by a content so as not to impair the sound field feeling as much as possible.

Solution to Problem

To solve the above problem, an information processing device that provides a service that requires an identity verification process according to an embodiment of the present disclosure includes: a first acquisition unit configured to acquire head rotation information of a user; a transmission unit configured to transmit the head rotation information to a cloud system; a second acquisition unit configured to acquire content information to be presented to the user and meta information accompanying the content information, the content information being generated by predetermined processing performed by the cloud system using the head rotation information; and a correction unit configured to correct, based on the meta information, a presentation position of a content reproduced by the content information.

DESCRIPTION OF EMBODIMENTS

Figure 1:
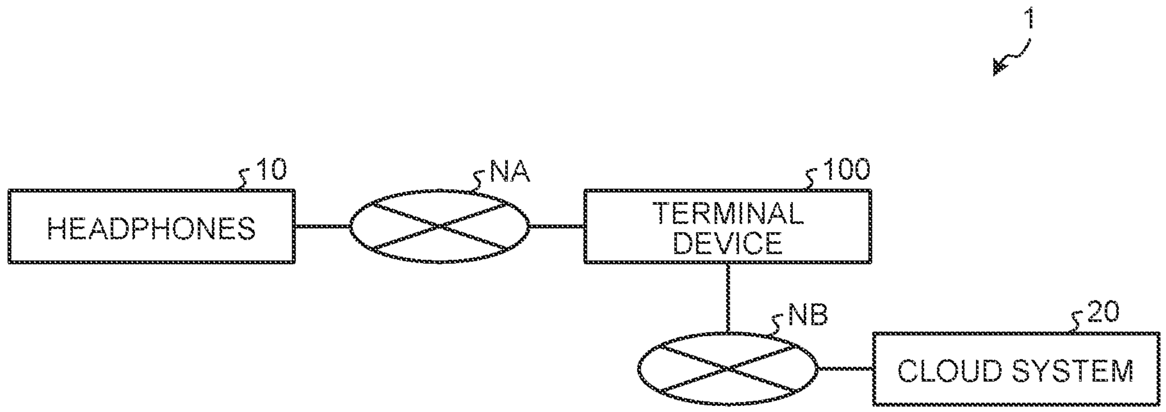
FIG. 1 is a diagram illustrating a configuration example of an information processing system according to a first embodiment of the present disclosure.

Hereinafter, embodiments of the present disclosure will be described in detail with reference to the drawings. It is noted that, in the following embodiments, components having substantially the same functional configuration may be denoted by the same number or reference numeral, and a redundant description may be omitted. In addition, in the present specification and the drawings, a plurality of components having substantially the same functional configuration may be distinguished and described by attaching different numbers or reference numerals after the same number or reference numeral.

Furthermore, the present disclosure will be described according to the following item order.

1. Introduction
1-1. Background
1-2. Headphones reproduction and head rotation tracking
1-3. Influence of delay of tracking head rotation
2. First Embodiment
2-1. System configuration example
2-2. Outline of information processing
2-3. Device configuration example
2-4. Processing procedure example
3. Second Embodiment
3-1. Outline of information processing
3-2. Device configuration example
3-3. Processing procedure example
4. Third Embodiment
4-1. Outline of information processing
4-2. Device configuration example
4-3. Processing procedure example
5. Fourth Embodiment
5-1. Outline of information processing
5-2. Device configuration example
5-3. Processing procedure example
6. Others
7. Hardware configuration example
8. Conclusion

1. Introduction

1-1. Background

In recent years, in the field of audio, a system that records, transmits, and reproduces spatial information from the entire surroundings has been developed and spread. For example, in ultra-high resolution broadcasting standards, so-called Super Hi-Vision, broadcasting with 22.2 channel three-dimensional multichannel sound is planned. Furthermore, in the field of virtual reality, in addition to a video that surrounds the entire periphery, a device that reproduces a signal that surrounds the entire periphery also in audio is spreading in the world.

On the other hand, in the multichannel audio as described above, a large number of speakers are required in the reproduction environment, and thus more speakers are required in a case where the spatial resolution of sound is to be increased. For this reason, it is unrealistic to make such a system at home or the like. Furthermore, in a space such as a movie theater, an area that can be correctly reproduced is narrow, and it is difficult to give a desired effect to all spectators. As one means for solving such a problem, there is a combination with a binaural reproduction technology.

The binaural reproduction technology is also referred to as a virtual auditory display (VAD), and is realized by using a head-related transfer function (HRTF). The head-related transfer function expresses information on how sound is transmitted from all directions surrounding the human head to the eardrums of both ears as a function of a frequency and an arrival direction. In a case where a synthesis of the head-related transfer function from a certain direction with respect to a target audio is presented by headphones, a listener perceives that the sound comes not from the headphones but from the certain direction. An auditory display is a system utilizing this principle. By reproducing a plurality of virtual speakers using the auditory display, the same effect as reproduction in a speaker array system using a large number of unrealistic speakers can be achieved using headphones worn on the ears of the listener.

Examples of a method of enhancing the effect of the auditory display include use of the head-related transfer function as close as possible to that of a listener himself or herself, and use of a technology of tracking a movement of the head of the listener and reproducing the movement so that a virtual sound source and a virtual speaker are fixed in a space where the listener is present. The latter technology is also called head tracking, is used in a so-called XR-compatible device such as a head mounted display (HMD) and AR glasses, and is widely recognized. Such an XR-compatible device is often a mobile device or a wearable device, and its calculation resource is limited due to demand for reduction in size and weight. In addition, in recent years, with the advent of next-generation communication standards such as 5G, high-speed and large-capacity data communication can be realized, and accordingly, it is expected that a cloud system capable of providing resource flexibility and scale merit will be responsible for arithmetic processing conventionally performed in the XR-compatible device.

Furthermore, regarding the auditory display, in a case where a binaural signal for headphones reproduction obtained by synthesizing an audio signal and a head-related transfer function by a cloud system is transmitted to a terminal device of a listener (end user), it is conceivable that the processing of the head tracking is also executed. At this time, low-latency head tracking is required to accurately detect a direction of the head of a user without delay so as not to impair usability.

1-2. Headphones Reproduction and Head Rotation Tracking

The above-described head-related transfer function is obtained by normalizing a transmission characteristic from a sound source position to an eardrum position in a state where the head is present in a free space with a transmission characteristic from a sound source position to a center of the head in a state where the head is not present. A head-related transfer function H (v, ω) is expressed by the following formula (1). In the following formula (1), $H_1(v, \omega)$ represents a transmission characteristic from a sound source position v to an eardrum position in a state where the head is present in the free space. Furthermore, in the following formula (1), $H_0(v, \omega)$ represents a transmission characteristic from the sound source position v to a center O of the virtual head in a state where the head is not present in the free space. It is noted that, although this definition is an academic strict definition, only the transmission characteristic $H_1$ from the sound source to both ears may be used, or a transmission characteristic from the sound source to both ears in a space other than the free space may be used.

$$H(v, \omega) = \frac{H_1(v, \omega)}{H_0(v, \omega)} \tag{1}$$

By convolving the head-related transfer function H expressed by the above-described formula (1) into any audio signal and presenting the audio signal by headphones or the like, it is possible to give a listener an illusion as if the sound is heard from the direction (the sound source position v) of the convolved head-related transfer function H. Using this principle, when a speaker drive signal S is simulated by presentation by the headphones, a headphone drive signal (binaural signal) $B_l(\omega)$ for driving a left ear unit of the headphones is expressed by the following formula (2). In addition, a headphone drive signal (binaural signal) $B_r(\omega)$ for driving a right ear unit of the headphones is expressed by the following formula (3). In this way, the speaker drive signal S can be reproduced by presentation by the headphones.

$$B_l(\omega) = \sum_{i=1}^{L} S(v_i, \omega) H_l(v_i, \omega) \tag{2}$$

$$B_r(\omega) = \sum_{i=1}^{L} S(v_i, \omega) H_r(v_i, \omega) \tag{3}$$

In addition, a headphone drive signal $B_l(g, \omega)$ of the left ear side unit of the headphones when the head of a listener rotates in a certain direction g is expressed by the following formula (4). In the following formula (4), the direction g represents a rotation matrix representing a set of three angles ($\phi$, $\theta$, $\psi$) of the Euler angle.

$$B_l(g, \omega) = \sum_{i=1}^{L} S(v_i, \omega) H_l(g^{-1} v_i, \omega) \tag{4}$$

As described above, in a case where head rotation information indicating a movement (rotation direction) of the head of the listener can be acquired, a head-related transfer function of a sound source position ($g^{-1}v$) of a relative virtual sound source viewed from the head of the listener is used. As a result, similarly to the presentation by the speaker, a position of a sound image viewed from the listener is fixed and presented in the space even in the presentation by the headphones.

1-3. Influence of Delay of Tracking Head Rotation

A consideration is given as to a case in which a binaural signal for headphones reproduction corresponding to a virtual sound source in the sound source position v, is calculated by a cloud system based on head rotation information $g(t_1)$ at a certain time $t_1$, the calculated binaural signal is transmitted to a terminal device of a listener (end user), and the terminal device reproduces the calculated binaural signal at time $t_2$. Assuming that head rotation information $g(t_2)$ is acquired as head rotation information of the listener at time $t_2$, a difference between a sound source position $v(t_2)=g(t_2)^{-1}v$ of a virtual sound source to be presented and a sound source position $v(t_1)=g(t_1)^{-1}v$ of a virtual sound source of the generated binaural signal appears as an interaural time difference (ITD), an interaural level difference (ILD), and a difference (error) between the right and left differences in frequency characteristics. A difference between the interaural time differences is expressed by the following formula (5). A difference between the interaural level differences is expressed by the following formula (6). The difference between right and left differences in frequency characteristics is expressed by the following formula (7).

$$e_{ITD}(v(t_2), v(t_1)) = ITD(v(t_2)) - ITD(v(t_1)) \tag{5}$$

$$e_{ILD}(v(t_2), v(t_1)) = ILD(v(t_2)) - ILD(v(t_1)) \tag{6}$$

$$e_H(v(t_2), v(t_1), \omega, LR) = H_{LR}(v(t_2), \omega) - H_{LR}(v(t_1), \omega) \tag{7}$$

As described below, embodiments of the present disclosure propose a method of correcting a binaural signal so as to reduce a difference (error) between the sound source position $v(t_1)=g(t_1)^{-1}v$ of a virtual sound source to be presented by a binaural signal generated by the cloud system and the sound source position $v(t_2)=g(t_2)^{-1}v$ of a virtual sound source when the binaural signal is reproduced on headphones. It is noted that the above-described formula (5) is an example of a method of calculating the interaural time difference, and the calculation method is not particularly limited as long as the interaural time difference can be calculated. In addition, the above-described formula (6) also represents an example of a method of calculating the interaural level difference, and the calculation method is not particularly limited as long as the interaural level difference can be calculated. In addition, the above-described formula (7) also represents an example of a method of calculating a difference between frequency characteristics, and the calculation method is not particularly limited as long as the difference between the frequency characteristics can be calculated.

2. First Embodiment

<2-1. System Configuration Example>

Hereinafter, a configuration of an information processing system 1 according to a first embodiment of the present disclosure will be described with reference to FIG. 1. FIG. 1 is a diagram illustrating a configuration example of the information processing system according to the first embodiment of the present disclosure.

As illustrated in FIG. 1, the information processing system 1 according to the first embodiment includes headphones 10, a cloud system 20, and a terminal device 100 (an example of an information processing device according to the embodiment of the present disclosure). It is noted that FIG. 1 illustrates an example of the information processing system 1 according to the first embodiment, and the larger number of headphones 10, cloud systems 20, and terminal devices 100 than those of the example illustrated in FIG. 1 may be included.

The headphones 10 and the terminal device 100 are connected to a network NA in a wired or wireless manner. The headphones 10 and the terminal device 100 can communicate with each other through the network NA. The network NA may include, for example, a wireless communication network such as Wi-Fi (registered trademark) or Bluetooth (registered trademark).

The cloud system 20 and the terminal device 100 are connected to a network NB in a wired or wireless manner. The cloud system 20 and the terminal device 100 can communicate with each other through the network NB. The network NB may include a public line network such as the Internet, a telephone line network, or a satellite communication network, various local area networks (LANs) including Ethernet (registered trademark), a wide area network (WAN), or the like. The network NB may include a dedicated line network such as an Internet protocol-virtual private network (IP-VPN). Furthermore, the network NB may include a wireless communication network such as Wi-Fi (registered trademark) or Bluetooth (registered trademark).

The headphones 10 are mounted on the head of a listener. The headphones 10 include, for example, a left ear unit 10L and a right ear unit 10R (for example, refer to FIG. 2). The headphones 10 reproduce and output a binaural signal (an example of "content information") received from the terminal device 100. It is noted that, in the first embodiment of the present disclosure, an example in which the information processing system 1 includes the headphones 10 will be described. However, a headset connectable to the terminal device 100, an earphone, AR glasses (smart glasses), or a wearable device such as an HMD may be used.

In addition, the headphones 10 include an inertial sensor for acquiring inertial information about a movement (rotation direction) of the head of the listener. The inertial sensor detects inertial information such as acceleration and angular velocity. The inertial sensor is implemented by an acceleration sensor, a gyro sensor, an inertial measurement unit (IMU), and the like. Furthermore, the headphones 10 generate head rotation information indicating the movement (rotation direction) of the head of the listener based on the detected inertial information. The head rotation information includes, for example, a rotation matrix representing a set of three Euler angles ($\phi$, $\theta$, $\omega$) indicating the rotation direction of the head of the listener. Alternatively, the head rotation information is formed of a quaternary number (Quaternion). The headphones 10 continuously transmit the generated head rotation information to the terminal device 100 while being connected to the terminal device 100.

The cloud system 20 is a system that executes binaural operation processing and head tracking processing to generate a binaural signal (an example of "content information") for presenting a stereophonic sound for a predetermined audio content with respect to a listener wearing the headphones 10. The cloud system 20 can generate, for example, a binaural signal of an audio constituting an audio content, a binaural signal of an audio included in a content of a video or a moving image, a binaural signal of an audio constituting an XR content, and the like. The cloud system 20 is implemented by, for example, a cloud system in which a server device and a storage device connected to a network operate in cooperation with each other.

Furthermore, the cloud system 20 stores measurement data regarding a head-related transfer function of a user (for example, a listener U) of the terminal device 100. The measurement data may be a head-related impulse response (HRIR), which is data in a time domain in which temporal impulse responses of various places around the user of the terminal device 100 are made to correspond to each coordinate, or may be a head-related transfer function, which is data in a frequency domain obtained by performing frequency analysis on the head-related impulse response. It is noted that the cloud system 20 may acquire, from the terminal device 100, the measurement data regarding the head-related transfer function of the user (for example, the listener U) of the terminal device 100.

The terminal device 100 is an information processing device used by a listener wearing the headphones 10. The terminal device 100 corrects a binaural signal received from the cloud system 20 as described below. The terminal device 100 transmits the corrected binaural signal to the headphones 10. It is noted that the terminal device 100 may be an information processing device integrated with the headphones 10.

<2-2. Outline of Information Processing>

Figure 2:
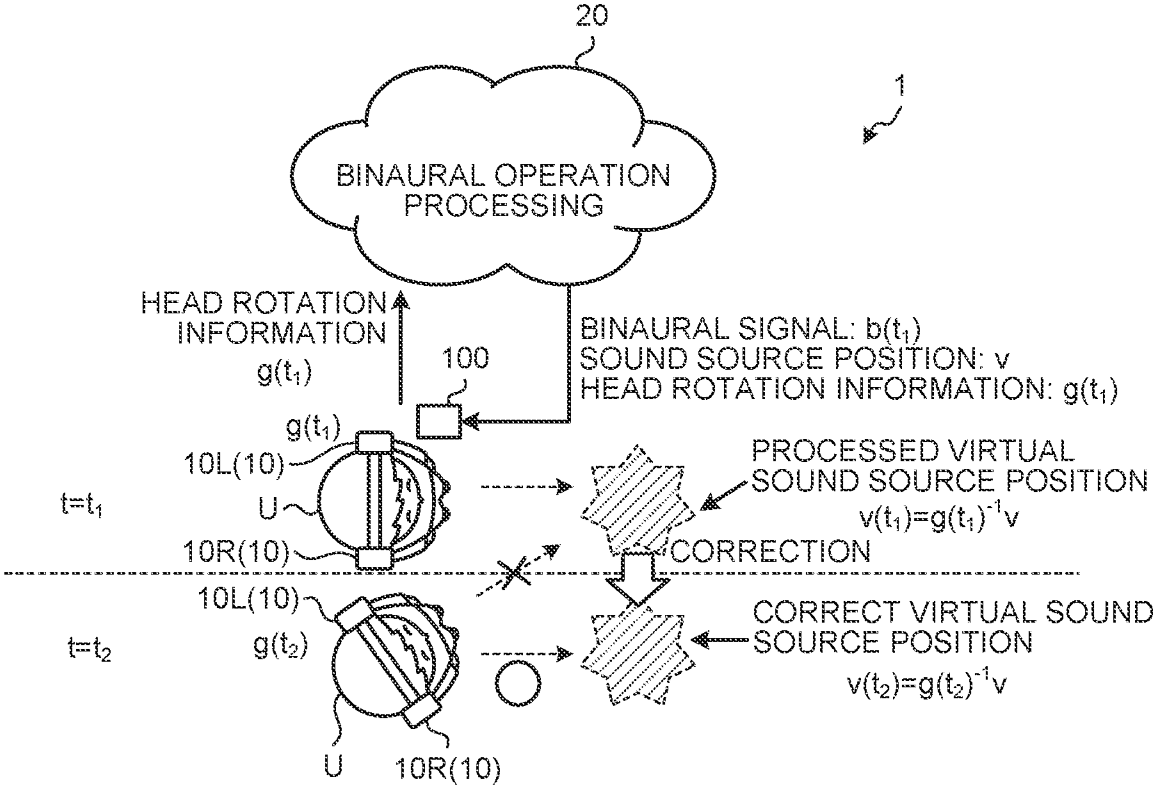
FIG. 2 is a diagram illustrating an outline of information processing according to the first embodiment of the present disclosure.

Hereinafter, an outline of information processing according to the first embodiment of the present disclosure will be described with reference to FIG. 2. FIG. 2 is a diagram illustrating the outline of the information processing according to the first embodiment of the present disclosure. FIG. 2 illustrates a state in which an angle of the head of the listener U rotates counterclockwise by about 45 degrees from time $t_1$ to time $t_0$. It is noted that time information such as the time $t_1$ and the time $t_2$ is assumed to be a time corresponding to a time step (for example, 20 milliseconds) updated for each content frame.

The terminal device 100 receives head rotation information $g(t_1)$ of the listener U at a certain time $t_1$ from the headphones 10. It is noted that the terminal device 100 may receive inertial information at the certain time $t_1$ from the headphones 10. In this case, the terminal device 100 generates the head rotation information $g(t_1)$ based on the received inertial information. The terminal device 100 transmits the head rotation information $g(t_1)$ of the listener U at the certain time $t_1$ to the cloud system 20. It is noted that the cloud system 20 may receive the inertial information at the certain time $t_1$ from the headphones 10. In this case, the cloud system 20 generates the head rotation information $g(t_1)$ based on the inertial information received through the terminal device 100.

The cloud system 20 executes binaural operation processing including head tracking processing by using the head rotation information $g(t_1)$ received from the terminal device 100. Specifically, the cloud system 20 convolves the head-related transfer function H corresponding to the head rotation information $g(t_1)$ with an audio signal of a predetermined audio content, thereby generating a binaural signal $b_{t1}$. As a result, the cloud system 20 can generate the binaural signal $b_{t1}$ that can give the listener U an illusion as if the sound of the audio content is heard from a sound source position v of a relative virtual sound source viewed from the head of the listener U at the certain time $t_1$. The binaural signal $b_{t1}$ generated by the cloud system 20 is expressed by the following formula (8). It is noted that $b_{t1}$ is a notation including a channel bi, $t_1$ corresponding to the left ear and a channel $b_{r,\,t1}$ corresponding to the right ear, and the channel $b_{l,\,t1}$ corresponding to the left ear is described in the following formula.

$$b_{l,t_1} = s_{t_1} * hrir_l\left(g(t_1)^{-1} v\right) \tag{8}$$

The cloud system 20 transmits the generated binaural signal $b_{t1}$ and meta information accompanying the binaural signal $b_{t1}$ to the terminal device 100. The meta information includes the sound source position v of the virtual sound source corresponding to the binaural signal $b_{t1}$ and the head rotation information $g(t_1)$ used to generate the binaural signal $b_{t1}$. In addition, the cloud system 20 may transmit, to the terminal device 100, specific information for specifying the head rotation information $g(t_1)$ used to generate the binaural signal $b_{t1}$ as the meta information instead of the head rotation information $g(t_1)$. An example of the specific information includes time $t_1$ when the head rotation information $g(t_1)$ is detected by the headphones 10.

Upon receiving the binaural signal $b_{t1}$ and the meta information from the cloud system 20, the terminal device 100 corrects the binaural signal $b_{t1}$ based on the meta information, thereby correcting the sound source position of the virtual sound source reproduced by the binaural signal $b_{t1}$.

For example, as illustrated in FIG. 2, in the information processing system 1 in which the cloud system 20 is caused to perform the above-described binaural operation processing having a large processing load, calculation performance of the terminal device 100 is not so high in many cases. Therefore, the processing load due to the correction of the binaural signal $b_{t1}$ in the terminal device 100 needs to be suppressed as much as possible. For example, the terminal device 100 preferentially selects a correction method capable of reducing the processing load and the latency as much as possible from among the selectable correction methods of the binaural signal $b_{t1}$.

The terminal device 100 acquires, from the cloud system 20, the binaural signal $b_{t1}$ and head rotation information $g(t_2)$ at a current time $t_2$ when the meta information is received. Subsequently, the terminal device 100 corrects the sound source position of the virtual sound source reproduced by the binaural signal $b_{t1}$ to obtain a correct sound source position corresponding to the head rotation information $g(t_2)$.

Specifically, the terminal device 100 calculates an error (deviation in the direction of the head of the listener U) between the sound source position of the virtual sound source corresponding to the binaural signal $b_{t1}$ and a sound source position of a correct virtual sound source corresponding to the head rotation information $g(t_2)$. For example, in a case where correction using an interaural time difference is selected as a method of correcting a binaural signal, the terminal device 100 calculates an error e between an interaural time difference associated with the head rotation information $g(t_1)$ used at the time of generating the binaural signal $b_{t1}$ and an interaural time difference associated with the head rotation information $g(t_2)$ when the binaural signal $b_{t1}$ is received from the cloud system 20 using the above-described formula (5). Then, the terminal device 100 corrects the binaural signal $b_{t1}$ using the calculated error e between interaural time differences. A corrected binaural signal $b'_{lt1}(n)$ corresponding to the left ear unit 10L of the headphones 10 is expressed by the following formula (9). Furthermore, a corrected binaural signal $b'_{rt1}(n)$ corresponding to the right ear unit 10R of the headphones 10 is expressed by the following formula (10).

$$b'_{l,t_1}(n) = b_{l,t_1}\left(n - \frac{e_{ITD}(v(t_2), v(t_1))}{2}\right) \tag{9}$$

$$b'_{r,t_1}(n) = b_{r,t_1}\left(n + \frac{e_{ITD}(v(t_2), v(t_1))}{2}\right) \tag{10}$$

By storing, in the terminal, a buffer larger than time twice the maximum value of the interaural time difference in addition to a frame length, even in a case where a value in parentheses on the right side of formula (9) is a negative value or in a case where a value in parentheses on the right side of formula (10) is a predetermined value (for example, the frame length of the binaural signal) or more, an audio based on the binaural signal is reproduced from the headphones 10 without interruption.

Furthermore, in a case where the correction of the binaural signal using the interaural level difference is selected, the terminal device 100 first calculates, using the above-described formula (6), an error e between an interaural level difference associated with the head rotation information $g(t_1)$ used at the time of generating the binaural signal $b_{t1}$ and an interaural level difference associated with the head rotation information $g(t_2)$ when the binaural signal $b_{t1}$ is received from the cloud system 20. Then, the terminal device 100 corrects the binaural signal $b_{t1}$ using the calculated error e between the interaural level differences. A corrected binaural signal corresponding to the left ear unit 10L of the headphones 10 is expressed by the following formula (11). Furthermore, a corrected binaural signal corresponding to the right ear unit 10R of the headphones 10 is expressed by the following formula (12).

$$b'_{l,t_1} = b_{l,t_1} \times 10^{\frac{e_{ITD}(v(t_2),v(t_1))}{20\cdot 2}} \tag{11}$$

$$b'_{r,t_1} = b_{r,t_1} \times 10^{\frac{e_{ITD}(v(t_2),v(t_1))}{20\cdot 2}} \tag{12}$$

Furthermore, the terminal device 100 can select at least one of the interaural time difference and the interaural level difference based on a frequency band of the binaural signal to correct the binaural signal. For example, the terminal device 100 may perform correction using the interaural time difference for a band less than a predetermined threshold among the bands of the binaural signal, and perform correction using the interaural level difference for a band equal to or greater than the predetermined threshold among the bands of the binaural signal. It is noted that interconversion processing performed on the binaural signal between a time domain and a frequency domain has a large processing load. Therefore, when a priority is given to reduction of the processing load, the terminal device 100 may perform correction using either the interaural time difference or the interaural level difference.

It is noted that, in a case where the terminal device 100 selects the correction of the binaural signal using the difference between the frequency characteristics calculated by the above-described formula (7), it is conceivable to divide the binaural signal $b_{t1}$ for each band and to perform correction.

<2-3. Device Configuration Example>

Figure 3:
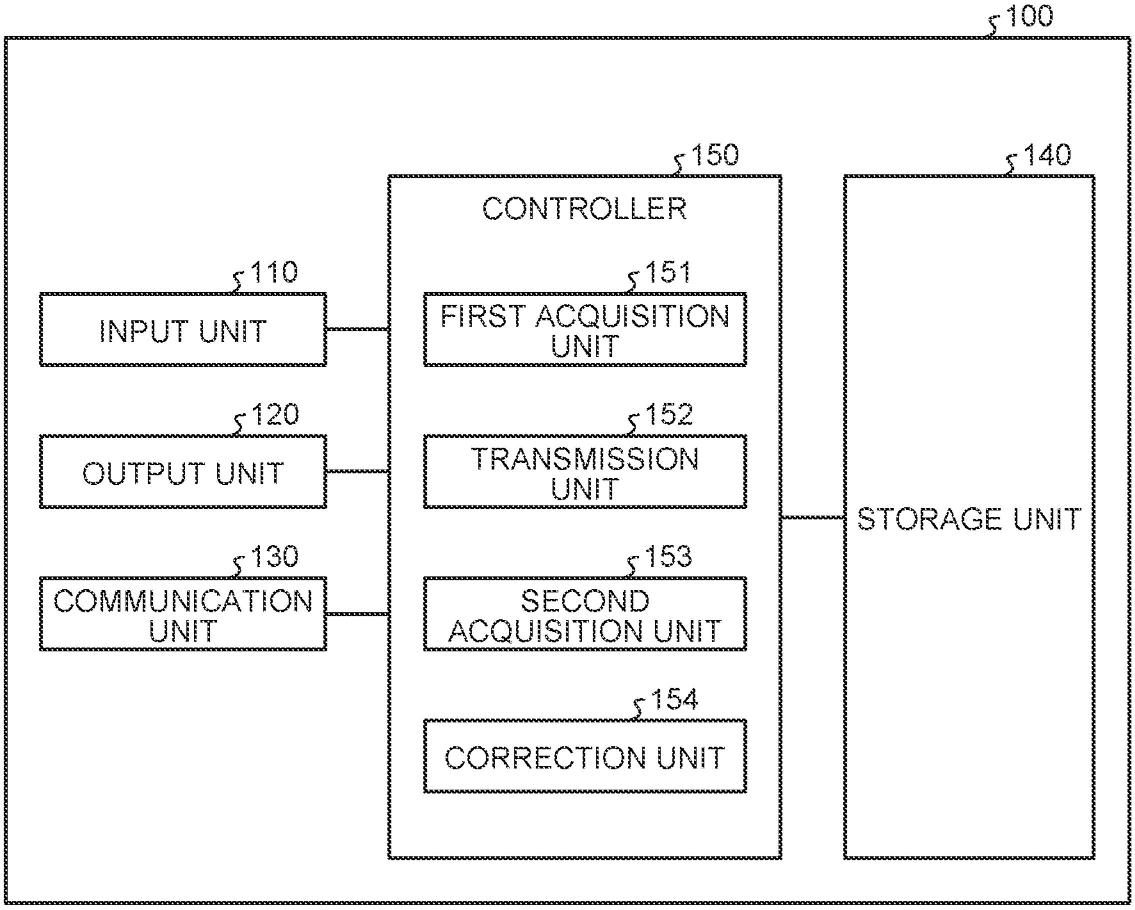
FIG. 3 is a block diagram illustrating a device configuration example of a terminal device according to the first embodiment of the present disclosure.

Hereinafter, a device configuration of the terminal device 100 according to the first embodiment of the present disclosure will be described with reference to FIG. 3. FIG. 3 is a block diagram illustrating a device configuration example of the terminal device according to the first embodiment of the present disclosure.

As illustrated in FIG. 3, the terminal device 100 includes an input unit 110, an output unit 120, a communication unit 130, a storage unit 140, and a controller 150. It is noted that, although FIG. 3 illustrates an example of a functional configuration of the terminal device 100 according to the first embodiment, the functional configuration is not limited to the example illustrated in FIG. 3, and another configuration may be used.

The input unit 110 receives various operations. The input unit 110 is implemented by an input device such as a mouse, a keyboard, or a touch panel. For example, the input unit 110 receives various operation inputs related to reproduction of an audio content from a user (for example, the listener U) of the terminal device 100 through a predetermined graphical user interface (GUI) or the like.

The output unit 120 outputs various types of information. The output unit 120 is implemented by an output device such as a display or a speaker. For example, the output unit 120 displays the predetermined GUI or the like for receiving various operation inputs related to the reproduction of the audio content from the user (for example, the listener U) of the terminal device 100.

The communication unit 130 transmits and receives various types of information. The communication unit 130 is implemented by a communication module for transmitting and receiving data to and from other devices such as the headphones 10 and the cloud system 20 in a wired or wireless manner. The communication unit 130 communicates with other devices by a method such as wired local area network (LAN), wireless LAN, Wi-Fi (registered trademark), infrared communication, Bluetooth (registered trademark), near field communication, or non-contact communication.

For example, the communication unit 130 receives head rotation information of the user (for example, the listener U) of the terminal device 100 from the headphones 10. Furthermore, the communication unit 130 transmits the head rotation information received from the headphones 10 to the cloud system 20. Furthermore, the communication unit 130 receives a binaural signal and meta information of the binaural signal from the cloud system 20. Furthermore, the communication unit 130 transmits the corrected binaural signal to the headphones 10.

The storage unit 140 is implemented by, for example, a semiconductor memory element such as a random access memory (RAM) or a flash memory, or a storage device such as a hard disk or an optical disk. The storage unit 140 can store, for example, programs, data, and the like for implementing various processing functions executed by the controller 150. The programs stored in the storage unit 140 include an operating system (OS) and various application programs. For example, the storage unit 140 may store measurement data related to a head-related transfer function of the user (for example, the listener U) of the terminal device 100. The measurement data may be a head-related impulse response, which is data in a time domain in which temporal impulse responses of various places around the user of the terminal device 100 are associated with each coordinate, or may be a head-related transfer function, which is data in a frequency domain obtained by performing frequency analysis on the head-related impulse response.

The controller 150 is implemented by a control circuit including a processor and a memory. The various types of processing executed by the controller 150 are implemented, for example, by executing a command described in a program read from an internal memory by a processor using the internal memory as a work area. The program read from the internal memory by the processor includes an operating system (OS) and an application program. Furthermore, the controller 150 may be implemented by, for example, an integrated circuit such as an application specific integrated circuit (ASIC), a field-programmable gate array (FPGA), or a system-on-a-chip (SoC).

Furthermore, a main storage device and an auxiliary storage device functioning as the internal memory described above are implemented by, for example, a semiconductor memory element such as a random access memory (RAM) or a flash memory, or a storage device such as a hard disk or an optical disk.

As illustrated in FIG. 3, the controller 150 includes a first acquisition unit 151, a transmission unit 152, a second acquisition unit 153, and a correction unit 154.

The first acquisition unit 151 acquires head rotation information of the user (for example, the listener U) of the terminal device 100 from the headphones 10 via the communication unit 130. For example, the first acquisition unit 151 can acquire, as the head rotation information, a rotation matrix representing a set of three Euler angles ($\phi$, $\theta$, $\psi$) indicating the rotation direction of the head of the listener U indicating the rotation direction of the head of the user of the terminal device 100 wearing the headphones 10. The first acquisition unit 151 transmits the acquired head rotation information to the transmission unit 152.

The transmission unit 152 transmits the head rotation information acquired from the first acquisition unit 151 to the cloud system 20 via the communication unit 130.

The second acquisition unit 153 acquires a binaural signal (an example of "content information") to be presented to the user (for example, the listener U) of the terminal device 100 and meta information accompanying the binaural signal. The binaural signal acquired by the second acquisition unit 153 is generated by binaural operation processing (an example of "predetermined processing") performed by the cloud system 20 using the head rotation information acquired by the first acquisition unit 151.

Furthermore, the meta information acquired by the second acquisition unit 153 includes a sound source position of a virtual sound source corresponding to the binaural signal and the head rotation information used to generate the binaural signal. It is noted that the second acquisition unit 153 may acquire, from the cloud system 20, specific information for specifying the head rotation information used to generate the binaural signal as the meta information instead of the head rotation information. An example of the specific information includes a detection time associated with the head rotation information.

The correction unit 154 corrects a presentation position of a content reproduced by the binaural signal by correcting the binaural signal acquired by the second acquisition unit based on the meta information acquired by the second acquisition unit 153 together with the binaural signal. That is, the correction unit 154 corrects the binaural signal acquired by the second acquisition unit based on the meta information acquired by the second acquisition unit 153 together with the binaural signal, thereby correcting the sound source position of the virtual sound source reproduced by the binaural signal.

Specifically, the correction unit 154 acquires the head rotation information at the current time when the binaural signal and the meta information are received from the cloud system 20. Subsequently, in a case where the correction of the binaural signal using the interaural time difference is selected, the correction unit 154 first calculates, using the above-described formula (5), an error between the interaural time difference associated with the head rotation information used at the time of generating the binaural signal and the interaural time difference associated with the head rotation information when the binaural signal is received from the cloud system 20. Then, the correction unit 154 corrects the binaural signal using the calculated error between the interaural time differences.

Furthermore, in a case where the correction of the binaural signal using the interaural level difference is selected, the correction unit 154 first calculates, using the above-described formula (6), an error between the interaural level difference associated with the head rotation information used at the time of generating the binaural signal and the interaural level difference associated with the head rotation information when the binaural signal is received from the cloud system 20. Then, the terminal device 100 corrects the binaural signal using the calculated error between the interaural level differences.

Furthermore, the correction unit 154 can select at least one of the interaural time difference and the interaural level difference based on a frequency band of the binaural signal to correct the binaural signal. For example, the correction unit 154 may perform correction using the interaural time difference for a band less than a predetermined threshold among the bands of the binaural signal, and perform correction using the interaural level difference for a band equal to or greater than the predetermined threshold among the bands of the binaural signal. Furthermore, for example, in a case where a priority is given to reduction of a processing load, the terminal device 100 may perform correction using either the interaural time difference or the interaural level difference.

Furthermore, the correction unit 154 may select the correction of the binaural signal using the difference between the frequency characteristics calculated by the above-described formula (7) according to the calculation performance of the terminal device 100. For example, it is conceivable that the correction unit 154 corrects the binaural signal by dividing the binaural signal for each band.

It is noted that, in a case where the second acquisition unit 153 acquires, instead of the head rotation information, the specific information for specifying the head rotation information used to generate the binaural signal, the correction unit 154 specifies the head rotation information used for the binaural operation processing using the specific information, and corrects the sound source position using the specified head rotation information. An example of the specific information includes the time $t_1$ when the head rotation information $g(t_1)$ is detected by the headphones 10.

<2-4. Processing Procedure Example>

Figure 4:
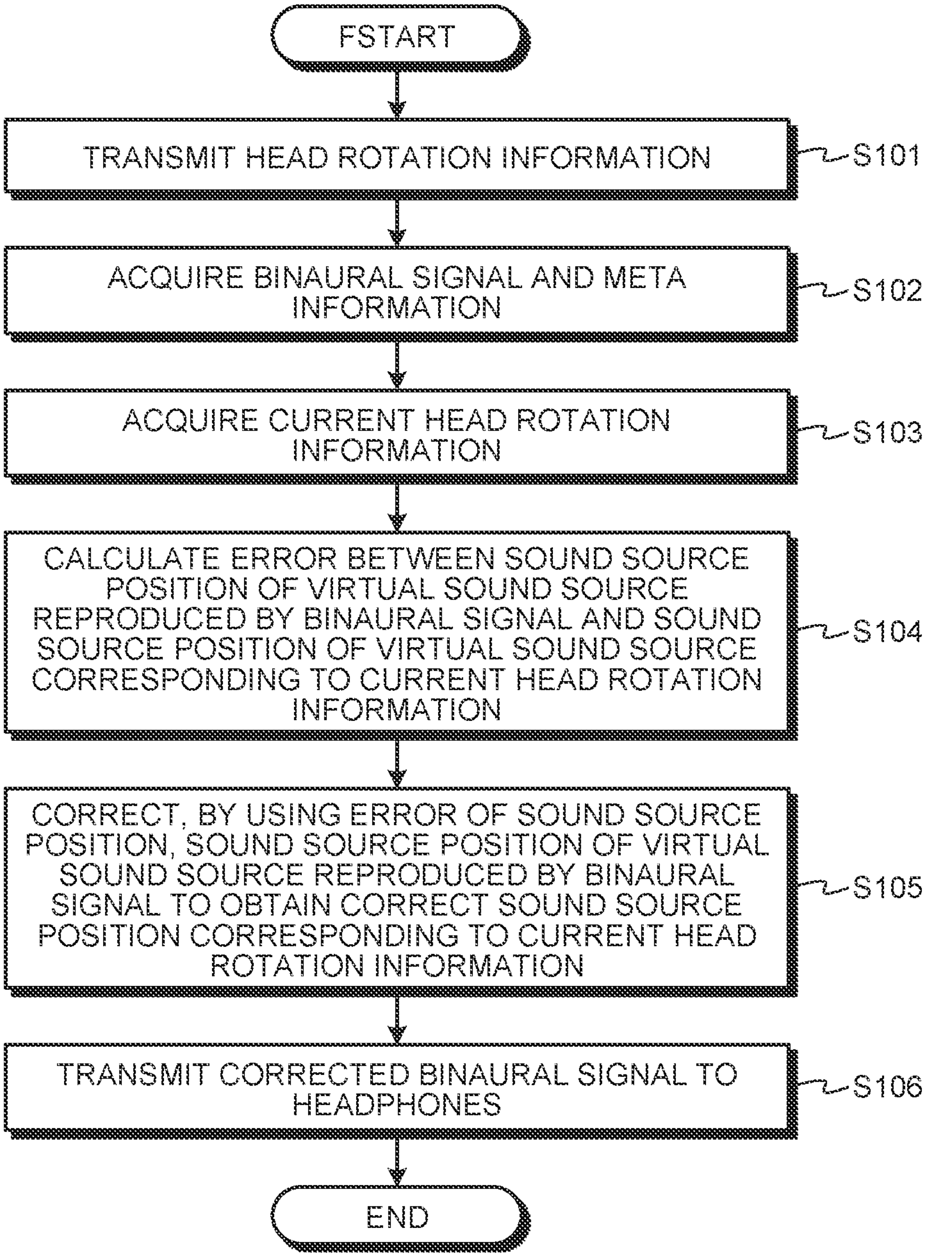
FIG. 4 is a flowchart illustrating an example of a processing procedure according to the first embodiment of the present disclosure.

Hereinafter, a processing procedure by the terminal device 100 according to the first embodiment of the present disclosure will be described with reference to FIG. 4. FIG. 4 is a flowchart illustrating an example of a processing procedure according to the first embodiment of the present disclosure. The processing procedure illustrated in FIG. 4 is executed by the controller 150 included in the terminal device 100.

As illustrated in FIG. 4, the transmission unit 152 transmits head rotation information acquired by the first acquisition unit 151 from the headphones 10 via the communication unit 130 to the cloud system 20 (step S101).

In addition, the second acquisition unit 153 acquires a binaural signal and meta information from the cloud system 20 via the communication unit 130 (step S102).

Furthermore, the correction unit 154 acquires current head rotation information from the first acquisition unit 151 (step S103).

Furthermore, the correction unit 154 calculates an error between a sound source position of a virtual sound source reproduced by the binaural signal acquired from the cloud system 20 and a sound source position of a virtual sound source corresponding to the current head rotation information (step S104). The correction unit 154 calculates an error between interaural time differences, an error between interaural level differences, or the like as the error between the sound source positions.

Furthermore, the correction unit 154 uses the error between the sound source positions to correct the sound source position of the virtual sound source reproduced by the binaural signal to obtain a correct sound source position corresponding to the current head rotation information (step S105).

Furthermore, the correction unit 154 transmits the corrected binaural signal to the headphones 10 via the communication unit 130 (step S106), and ends the processing procedure illustrated in FIG. 4.

3. Second Embodiment

<3-1. Outline of Information Processing>

Figure 5:
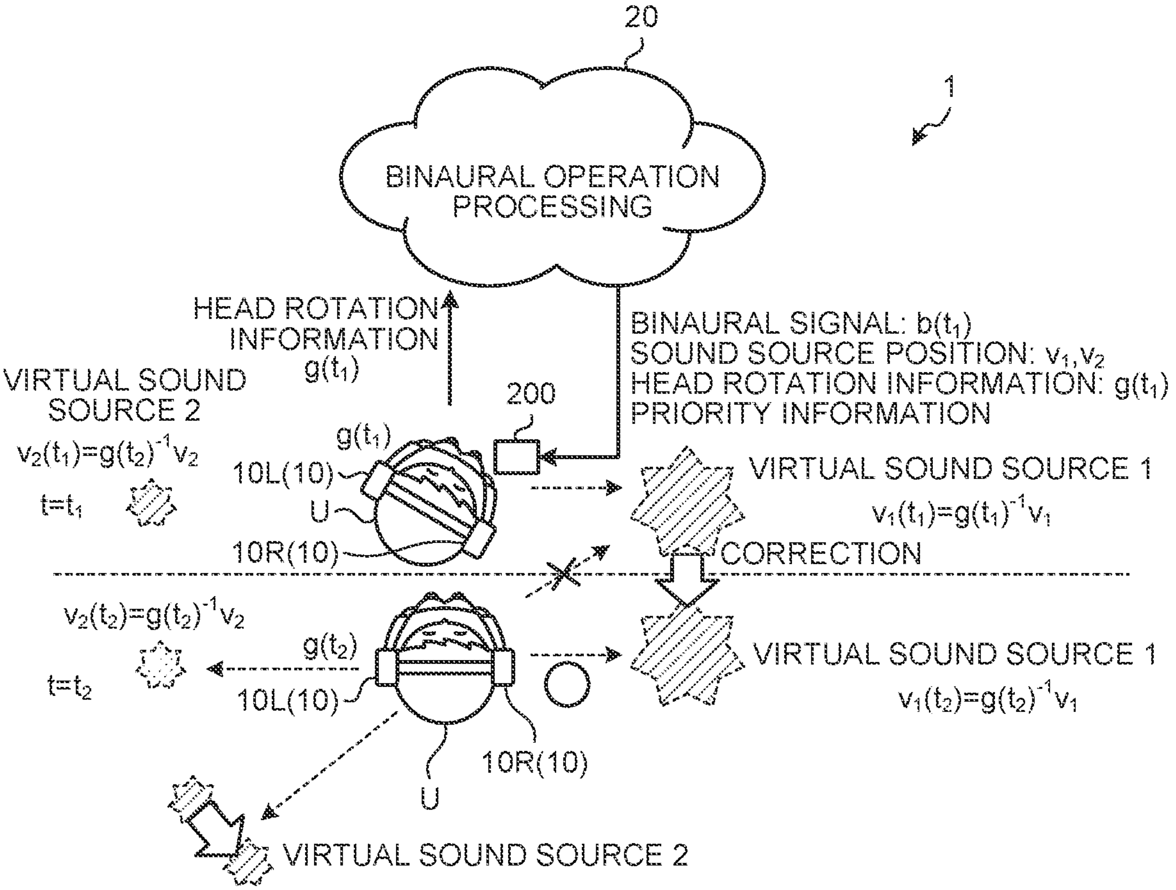
FIG. 5 is a diagram illustrating an outline of information processing according to a second embodiment of the present disclosure.

Hereinafter, an example of information processing according to a second embodiment of the present disclosure will be described. FIG. 5 is a diagram illustrating an outline of the information processing according to the second embodiment of the present disclosure. FIG. 5 illustrates a state in which the angle of the head of the listener U rotates counterclockwise by about 45 degrees from time $t_1$ to time $t_2$. It noted that an information processing system 1 according to the second embodiment has the same configuration as that of the first embodiment described above.

In the example illustrated in FIG. 5, a virtual sound source 1 and a virtual sound source 2 are included as virtual sound sources to be presented to the listener U by the cloud system 20 using a binaural signal. In the example illustrated in FIG. 5, the virtual sound source 1 and the virtual sound source 2 exist at positions facing each other with the listener U interposed therebetween. Furthermore, in the example illustrated in FIG. 5, two virtual sound sources including the virtual sound source 1 and the virtual sound source 2 are transmitted from the cloud system 20 to a terminal device 200 as a binaural signal $b_{t1}$ of one pair and two channels.

In the case illustrated in FIG. 5, when a sound source position of the virtual sound source 1 is corrected to a correct sound source position using the same correction method as that of the first embodiment described above, the virtual sound source 2 is localized at a position different from a sound source position to be originally corrected under the influence of the correction of the virtual sound source 1.

Therefore, the terminal device 100 acquires priority information for selecting the sound source position to be corrected from the plurality of sound sources from the cloud system 20 as one of the meta information of the binaural signal. A priority order indicated in the priority information may be labeled by a content creator of a content managed by the cloud system 20, or may be automatically performed by using software prepared in advance for labeling the priority order.

Furthermore, the terminal device 100 may determine the priority order based on an output of a learned model that is machine-learned so as to output a higher score as the sound source position of the virtual sound source to be corrected by inputting parameters such as a degree of importance set in advance according to components of the content such as a narration, a vocal, and a lead guitar, a magnitude of sound pressure at the ear of the listener U, a preference of the listener U, and head rotation information. Any method can be used as a machine learning method.

Furthermore, the terminal device 100 may determine the sound source position to be corrected by weighting in advance each parameter such as the degree of importance set in advance according to the components of the content, the magnitude of the sound pressure at the ear of the listener U, the preference of the listener U, and the head rotation information, and comprehensively considering a value corresponding to each parameter.

Furthermore, the terminal device 100 may determine the priority order of each of the sound source positions of the virtual sound source to be corrected, or may determine only a first place.

Referring back to FIG. 5, the terminal device 100 selects the sound source position to be corrected based on the priority information acquired from the cloud system 20. For example, in a case where the priority order of the sound source position of the virtual sound source 1 is higher than the priority order of the sound source position of the virtual sound source 2, the terminal device 100 selects the sound source position of the virtual sound source 1 as the sound source position to be corrected. Then, the terminal device 100 corrects the selected sound source position using the correction method of the first embodiment described above. When the priority order of the sound source position of the virtual sound source 2 is higher than the priority order of the sound source position of the virtual sound source 1, the sound source position of the virtual sound source 2 may be selected as the sound source position to be corrected. Furthermore, in a case where the priorities of the virtual sound source 1 and the virtual sound source 2 are the same, both sound source positions may be corrected, or either one may be preferentially selected based on information other than the priority (components of a content, a magnitude of sound pressure, directivity of the listener U, and the like).

<3-2. Device Configuration Example>

Figure 6:
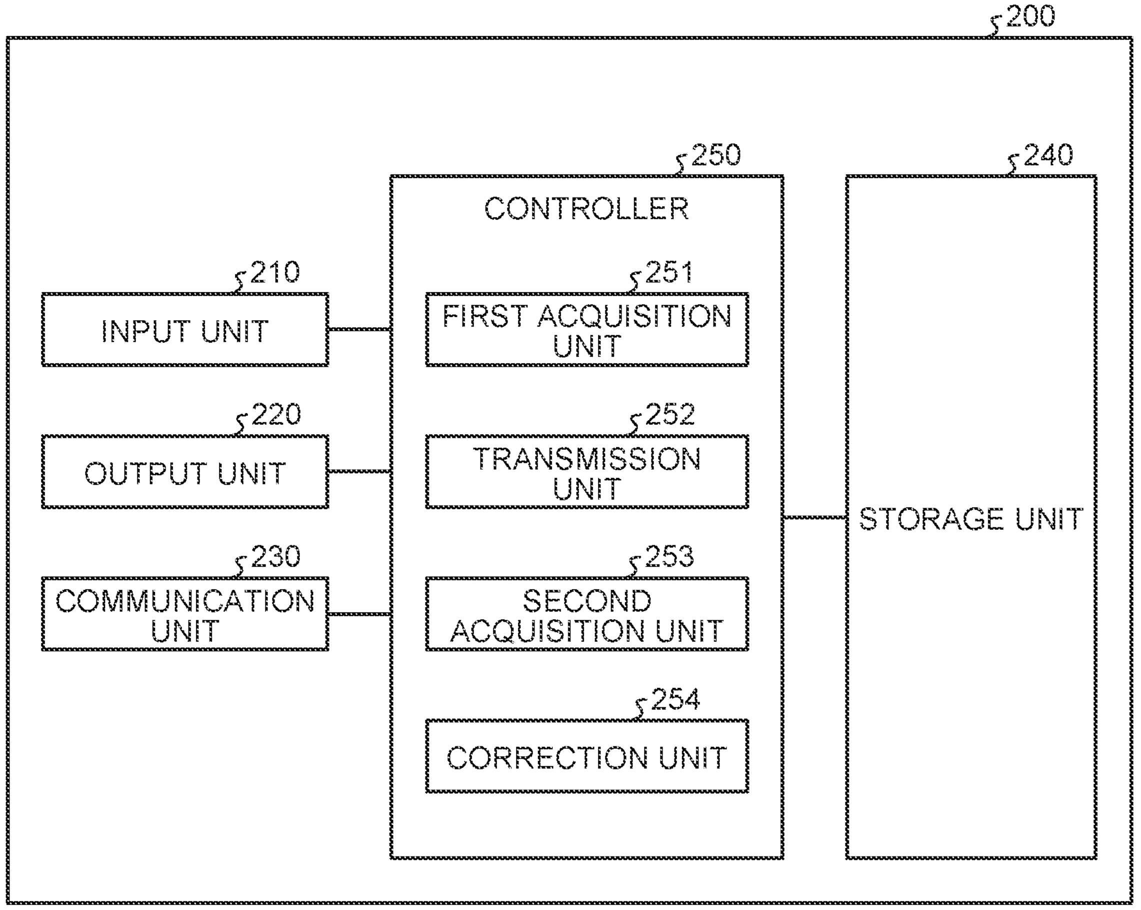
FIG. 6 is a block diagram illustrating a device configuration example of a terminal device according to the second embodiment of the present disclosure.

Hereinafter, a device configuration of the terminal device 200 according to the second embodiment of the present disclosure will be described with reference to FIG. 6. FIG. 6 is a block diagram illustrating a device configuration example of the terminal device according to the second embodiment of the present disclosure. An input unit 210, an output unit 220, a communication unit 230, a storage unit 240, and a controller 250 included in the terminal device 200 according to the second embodiment correspond to the input unit 110, the output unit 120, the communication unit 130, the storage unit 140, and the controller 150 included in the terminal device 100 according to the first embodiment, respectively. In addition, in the terminal device 200 according to the second embodiment, a part of the processing function implemented by each unit (a first acquisition unit 251, a transmission unit 252, a second acquisition unit 253, and a correction unit 254) included in the controller 250 is different from the processing function implemented by each unit of the controller 150 included in the terminal device 100 according to the first embodiment.

The second acquisition unit 253 further acquires, as the meta information, priority information indicating a priority in correcting the plurality of sound source positions from the cloud system 20. The second acquisition unit 253 transmits the acquired priority information to the correction unit 254.

The correction unit 254 selects a sound source position to be corrected from among the sound source positions of the plurality of virtual sound sources included in the binaural signal based on the priority information acquired from the second acquisition unit 253. Then, the correction unit 254 corrects the selected sound source position using the correction method of the first embodiment described above. Specifically, the correction unit 254 calculates an error between the selected sound source position and the sound source position of the virtual sound source corresponding to the current head rotation information.

<3-3. Processing Procedure Example>

Figure 7:
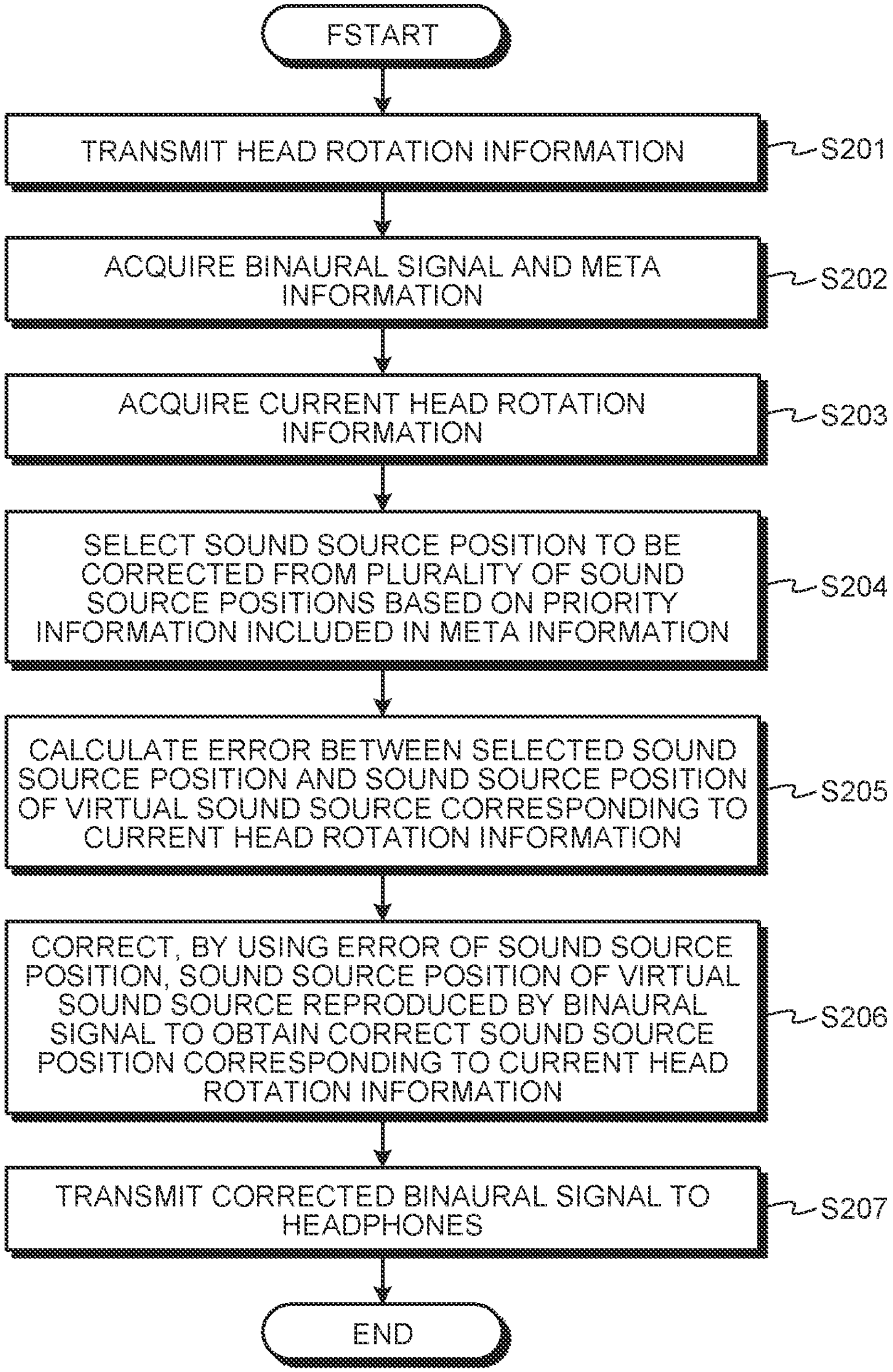
FIG. 7 is a flowchart illustrating an example of a processing procedure according to the second embodiment of the present disclosure.

Hereinafter, a processing procedure by the terminal device 100 according to the second embodiment of the present disclosure will be described with reference to FIG. 7. FIG. 7 is a flowchart illustrating an example of the processing procedure according to the second embodiment of the present disclosure. The processing procedure illustrated in FIG. 7 is executed by the controller 250 included in the terminal device 200. In the processing procedure illustrated in FIG. 7, steps S201 to S203, step 206, and step S207 respectively correspond to steps S101 to S103, step S105, and step S106 illustrated in FIG. 4. Further, in the processing procedure illustrated in FIG. 7, steps S204 and S205 are different from the processing procedure according to the first embodiment.

After performing the processing procedure in steps S201 to S203, the correction unit 254 selects the sound source position to be corrected from the plurality of sound source positions included in the binaural signal based on the priority information included in the meta information (step S204).

Furthermore, the correction unit 254 calculates an error between the selected sound source position and the sound source position of the virtual sound source corresponding to the current head rotation information (step S205), and proceeds to a processing procedure in step S206.

4. Third Embodiment

<4-1. Outline of Information Processing>

Figure 8:
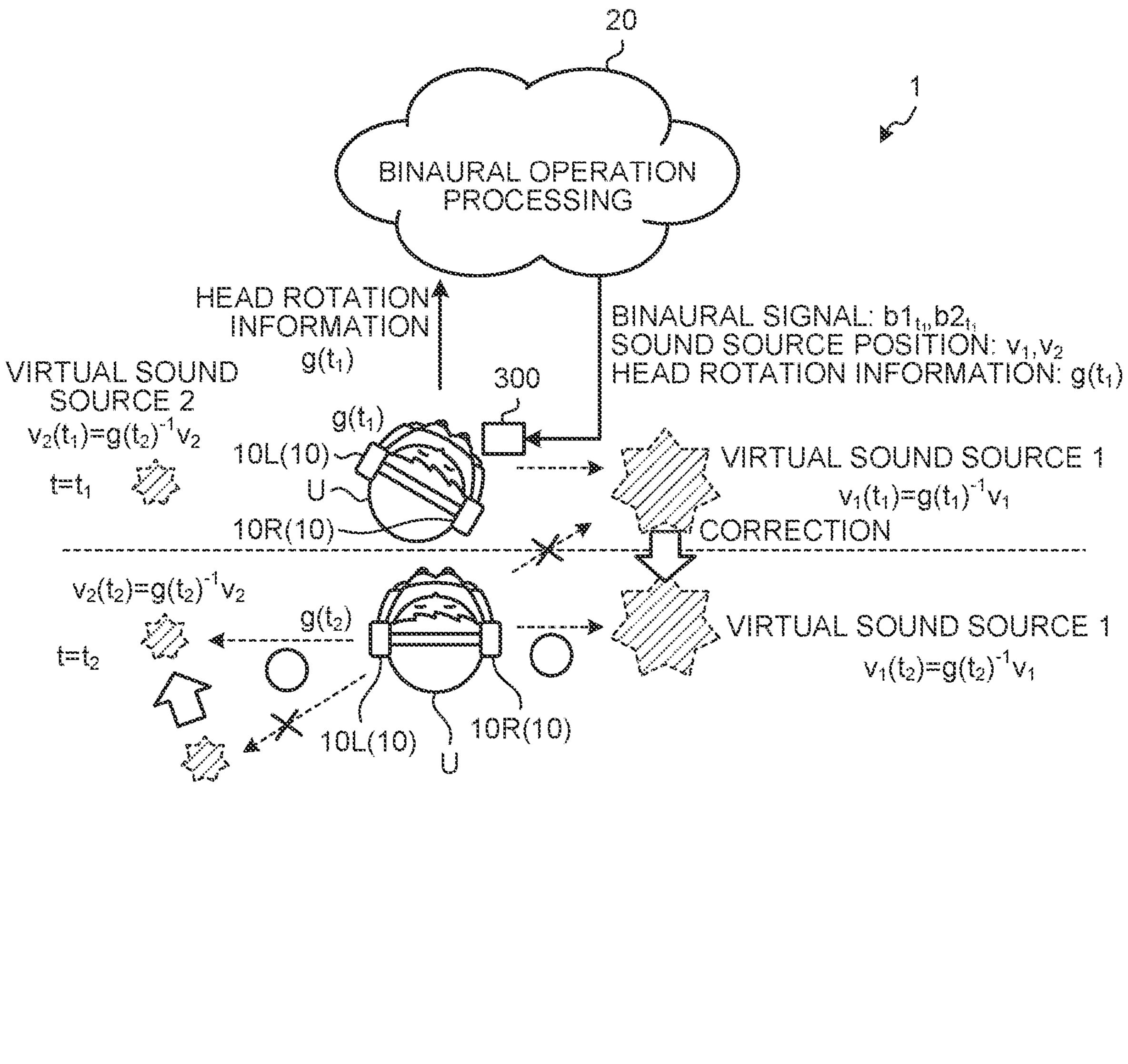
FIG. 8 is a diagram illustrating an outline of information processing according to a third embodiment of the present disclosure.

Hereinafter, an example of information processing according to a third embodiment of the present disclosure will be described. FIG. 8 is a diagram illustrating an outline of the information processing according to the third embodiment of the present disclosure. FIG. 8 illustrates a state in which the angle of the head of the listener U rotates counterclockwise by about 45 degrees from time $t_1$ to time $t_2$. It is noted that an information processing system 1 according to the third embodiment has the same configuration as that of the first embodiment described above.

In the second embodiment described above, a description has been given as to an example in which the sound source position to be corrected is selected based on the priority information from among the sound source positions of the plurality of virtual sound sources included in the binaural signal. For example, in a case where a transmission capacity of the cloud system 20 has a margin, it is possible to generate a binaural signal for each virtual sound source and transmit each of the binaural signal with a separate channel. In this case, the terminal device 100 may perform correction for each sound source position of the virtual sound source corresponding to the binaural signal generated for each virtual sound source. As a result, as in the second embodiment described above, it is possible to prevent the influence of the correction of the virtual sound source selected as a correction target on the virtual sound source not selected as a correction target (artifact of correction, or the like).

For example, in the second embodiment described above, two virtual sound sources including the virtual sound source 1 and the virtual sound source 2 are transmitted from the cloud system 20 to the terminal device 200 as a binaural signal of one pair and two channels. On the other hand, in the third embodiment, as illustrated in FIG. 8, two virtual sound sources including the virtual sound source 1 and the virtual sound source 2 are transmitted from the cloud system 20 to the terminal device 200 as two-pair binaural signals, that is, four channel signals. That is, in the third embodiment, in a case where the number of virtual sound sources is N, 2N-channel binaural signals are used. As a result, a terminal device 300 according to the third embodiment can correct the sound source position of the virtual sound source corresponding to the binaural signal received from the cloud system 20 for each sound source position similarly to the first embodiment described above.

<4-2. Device Configuration Example>

Figure 9:
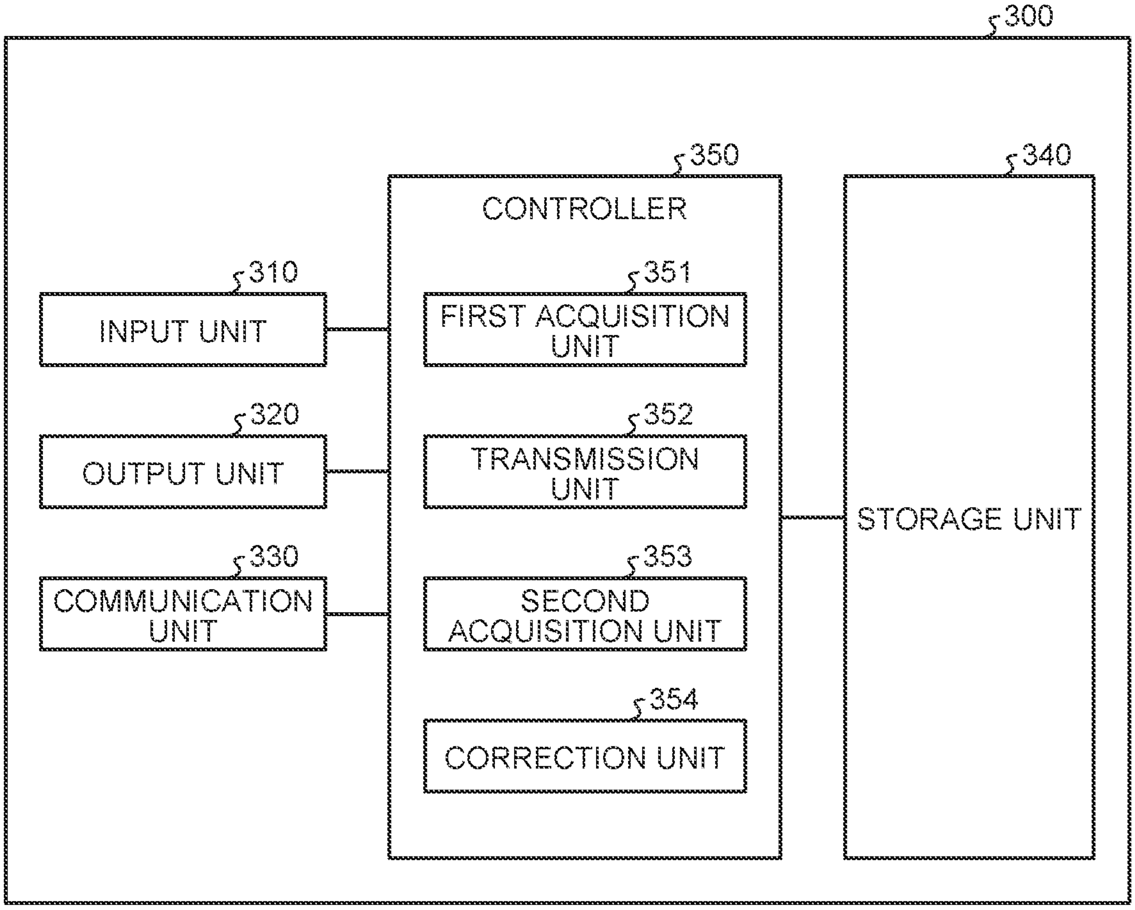
FIG. 9 is a block diagram illustrating a device configuration example of a terminal device according to the third embodiment of the present disclosure.

Hereinafter, a device configuration of the terminal device 300 according to the third embodiment of the present disclosure will be described with reference to FIG. 9. FIG. 9 is a block diagram illustrating a device configuration example of the terminal device according to the third embodiment of the present disclosure. An input unit 310, an output unit 320, a communication unit 330, a storage unit 340, and a controller 350 included in the terminal device 300 according to the third embodiment correspond to the input unit 110, the output unit 120, the communication unit 130, the storage unit 140, and the controller 150 included in the terminal device 100 according to the first embodiment, respectively. In addition, in the terminal device 300 according to the third embodiment, a part of the processing function implemented by each unit (a first acquisition unit 351, a transmission unit 352, a second acquisition unit 353, and a correction unit 354) included in the controller 350 is different from the processing function implemented by each unit of the controller 150 included in the terminal device 100 according to the first embodiment.

The correction unit 354 selects one binaural signal from the plurality of binaural signals acquired by the second acquisition unit 353. Then, the correction unit 354 corrects the sound source position corresponding to the selected binaural signal using the correction method of the first embodiment described above. Specifically, the correction unit 254 calculates an error between the sound source position corresponding to the selected binaural signal and the sound source position of the virtual sound source corresponding to the current head rotation information. The correction unit 354 corrects each of the sound source positions corresponding to the plurality of binaural signals acquired by the second acquisition unit 353.

<4-3. Processing Procedure Example>

Figure 10:
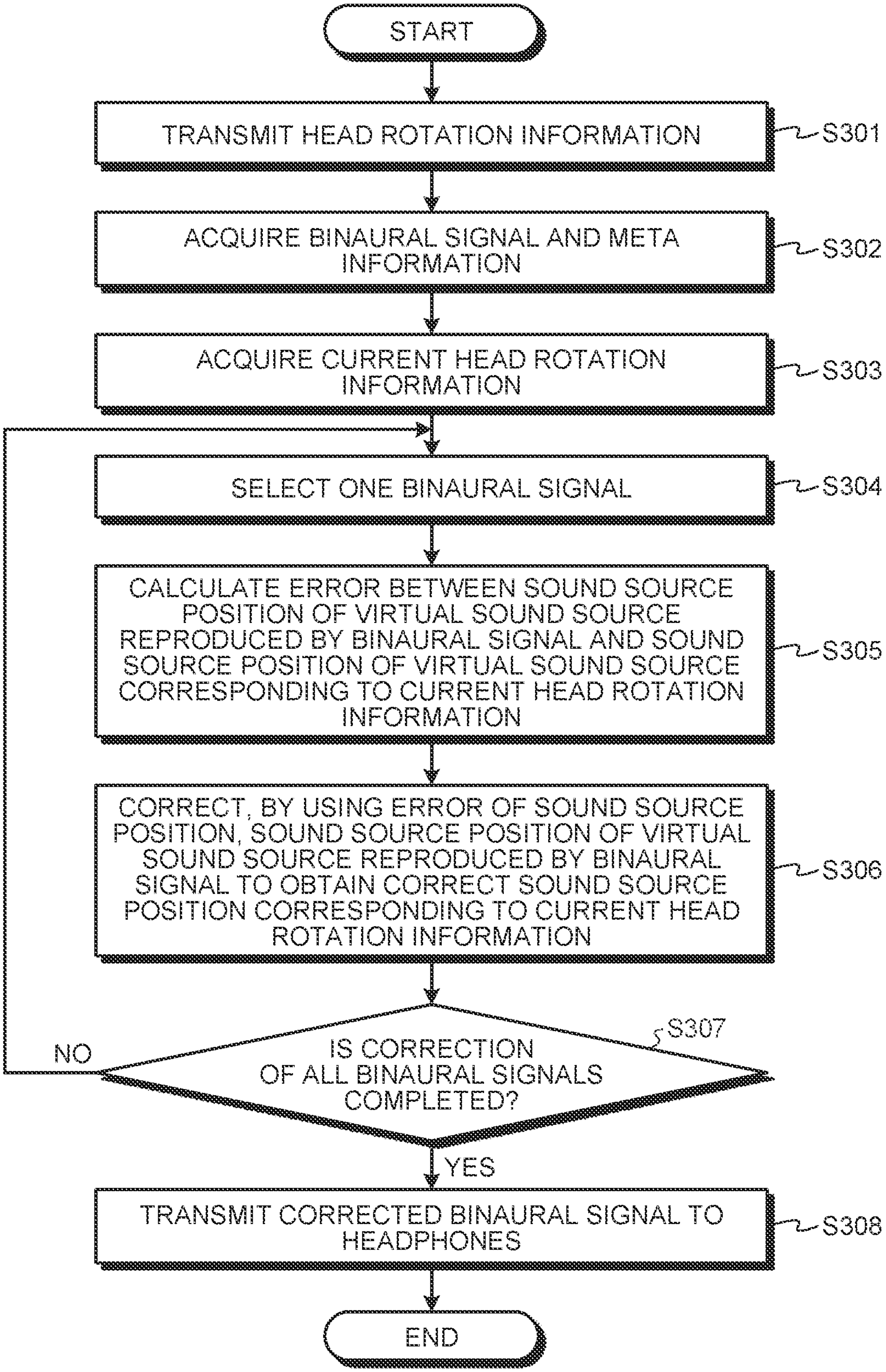
FIG. 10 is a flowchart illustrating an example of a processing procedure according to the third embodiment of the present disclosure.

Hereinafter, a processing procedure by the terminal device 300 according to the third embodiment of the present disclosure will be described with reference to FIG. 10. FIG. 10 is a flowchart illustrating an example of the processing procedure according to the third embodiment of the present disclosure. The processing procedure illustrated in FIG. 10 is executed by the controller 350 included in the terminal device 300. In the processing procedure illustrated in FIG. 10, steps S301 to S303, step 305, step S306, and step S308 correspond to steps S101 to S106 illustrated in FIG. 4. Further, in the processing procedure illustrated in FIG. 10, steps S304 and S307 are different from the processing procedure according to the first embodiment.

After performing the processing procedure in steps S301 to S303, the correction unit 354 selects one binaural signal from the plurality of binaural signals (step S304).

Furthermore, the correction unit 354 calculates an error between the sound source position corresponding to the selected binaural signal and the sound source position of the virtual sound source corresponding to the current head rotation information (step S305), and proceeds to a processing procedure in step S306.

Further, after performing the processing procedure in step S306, the correction unit 354 determines whether the correction has been completed for all the binaural signals received from the cloud system 20 (step S307).

In a case where the correction unit 354 determines that the correction has not been completed for all the binaural signals (step S307; No), the processing returns to the processing procedure in step S304 described above. On the other hand, in a case where the correction unit 354 determines that the correction has been completed for all the binaural signals (step S307; Yes), the processing proceeds to a processing procedure in step S308. It is noted that, in the processing procedure in step S308 or in the preceding procedure thereof, the corrected 2N-channel signals may be added to the right and left to form a two-channel signal, and the two-channel signal may be transmitted to the headphones 10.

5. Fourth Embodiment

<5-1. Outline of Information Processing>

Figure 11:
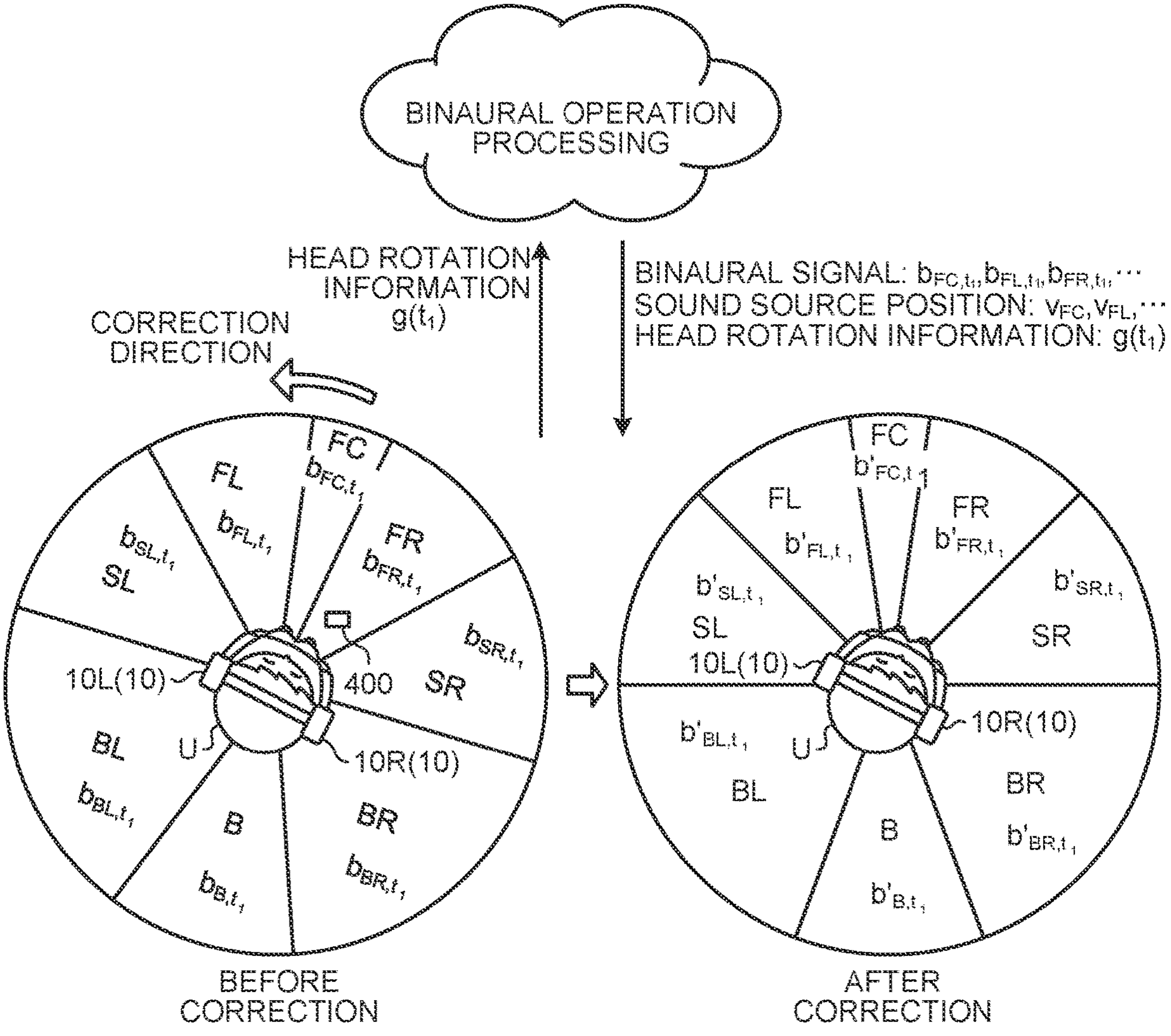
FIG. 11 is a diagram illustrating an outline of information processing according to a fourth embodiment of the present disclosure.

Hereinafter, an example of information processing according to a fourth embodiment of the present disclosure will be described. FIG. 11 is a diagram illustrating an outline of the information processing according to the fourth embodiment of the present disclosure. It noted that an information processing system 1 according to the fourth embodiment has the same configuration as that of the first embodiment described above.

In the third embodiment described above, a description has been given as to an example in which a binaural signal is generated for each virtual sound source, and each binaural signal is transmitted from the cloud system 20 to the terminal device 200 as a signal of different channels. However, for example, a plurality of virtual sound sources may be grouped on a predetermined basis. In the example illustrated in FIG. 11, the virtual sound sources are divided into eight groups by an angle with respect to the listener U. As a grouping method, for example, a method considering the angular resolution of the listener U can be used. In the example illustrated in FIG. 11, the group of virtual sound sources is divided into eight areas surrounding the listener U with the listener U as a center. An area of areas (regions) corresponding to a group of virtual sound sources located in the front direction of the listener U is small, and an area of areas (regions) corresponding to a group of virtual sound sources located on the side of the listener U is larger than the area in the front direction. It is noted that, as a method of dividing the area, the area may be divided in consideration of a sound image localization ability of the listener, and each area may be divided at an equal angle around the listener U, or may be dynamically changed depending on a content presented to a user. In addition, the method of dividing the area may be transmitted as meta information.

The division of the area is determined by rotation direction of the head of the listener U at time $t=t_1$. Furthermore, the division of the area may be updated for each time. The cloud system 20 generates a binaural signal corresponding to each divided area. The binaural signal generated for each area by the cloud system 20 is a signal of the number of areas×2 channels. The binaural signal generated for each area by the cloud system 20 is transmitted to the terminal device 100 together with the meta information including information indicating a sound source position corresponding to a position of an area. It is noted that the information indicating the sound source position may be angle information for specifying the area. The terminal device 100 corrects the binaural signal for each area.

<5-2. Device Configuration Example>

Figure 12:
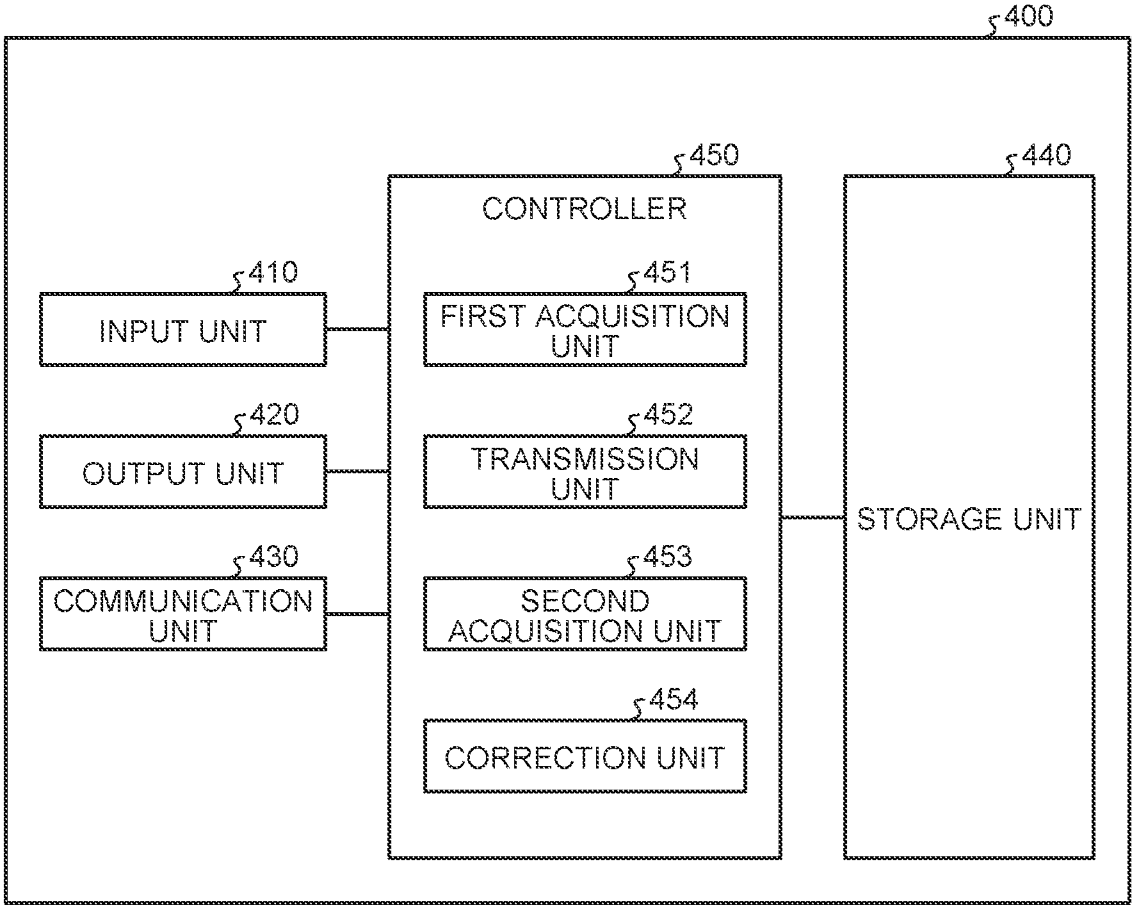
FIG. 12 is a block diagram illustrating a device configuration example of a terminal device according to the fourth embodiment of the present disclosure.

Hereinafter, a device configuration of a terminal device 400 according to the fourth embodiment of the present disclosure will be described with reference to FIG. 12. FIG. 12 is a block diagram illustrating a device configuration example of the terminal device according to the fourth embodiment of the present disclosure. An input unit 410, an output unit 420, a communication unit 430, a storage unit 440, and a controller 450 included in the terminal device 300 according to the fourth embodiment correspond to the input unit 110, the output unit 120, the communication unit 130, the storage unit 140, and the controller 150 included in the terminal device 100 according to the first embodiment, respectively. In addition, in the terminal device 400 according to the fourth embodiment, a part of the processing function implemented by each unit (a first acquisition unit 451, a transmission unit 452, a second acquisition unit 453, and a correction unit 454) included in the controller 450 is different from the processing function implemented by each unit of the controller 150 included in the terminal device 100 according to the first embodiment.

The second acquisition unit 453 acquires binaural signals corresponding to a plurality of areas obtained by grouping a plurality of sound source positions at a predetermined angle with respect to a user (for example, the listener U) of the terminal device 100, and information indicating sound source positions of virtual sound sources corresponding to the respective areas as meta information.

The correction unit 454 corrects the plurality of sound source positions for each area grouped at the predetermined angle with respect to the user (for example, the listener U) of the terminal device 100. Specifically, the correction unit 454 refers to the meta information acquired by the second acquisition unit 353, and selects a correction target area from the plurality of areas obtained by grouping the plurality of virtual sound sources. Then, the correction unit 454 calculates an error between the sound source position of the virtual sound source corresponding to the selected correction target area and the sound source position of the virtual sound source corresponding to the current head rotation information.

<5-3. Processing Procedure Example>

Figure 13:
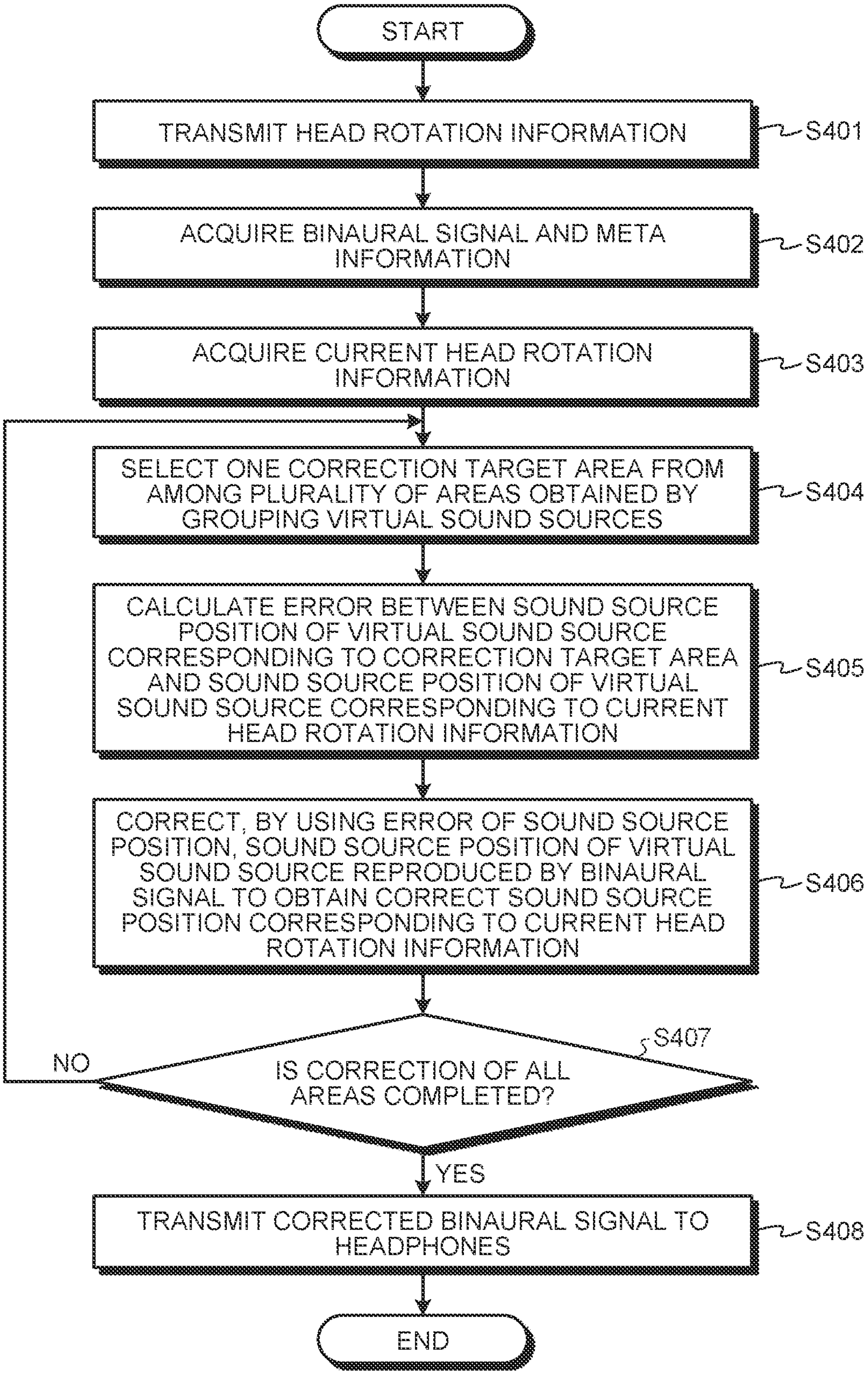
FIG. 13 is a flowchart illustrating an example of a processing procedure according to the fourth embodiment of the present disclosure.

Hereinafter, a processing procedure by the terminal device 400 according to the fourth embodiment of the present disclosure will be described with reference to FIG. 13. FIG. 13 is a flowchart illustrating an example of the processing procedure according to the fourth embodiment of the present disclosure. The processing procedure illustrated in FIG. 13 is executed by the controller 450 included in the terminal device 400. In the processing procedure illustrated in FIG. 13, steps S401 to S403, step 406, and step S408 correspond to steps S101 to S103, step S105, and step S106 illustrated in FIG. 4. In the processing procedure illustrated in FIG. 13, steps S404, S405, and S407 are different from the processing procedure according to the first embodiment.

After performing the processing procedure in steps S401 to S403, the correction unit 454 refers to the meta information acquired by the second acquisition unit 353 and selects a correction target area from a plurality of areas obtained by grouping a plurality of virtual sound sources (step S404).

Furthermore, the correction unit 454 calculates an error between the sound source position of the virtual sound source corresponding to the selected correction target area and the sound source position of the virtual sound source corresponding to the current head rotation information (step S405), and proceeds to a processing procedure in step S406.

After performing the processing procedure in step S406, the correction unit 454 determines whether the correction corresponding to all the areas has been completed (step S407).

In a case where the correction unit 454 determines that the correction corresponding to all the areas is not completed (step S407; No), the processing returns to the processing procedure in step S404 described above. On the other hand, when the correction unit 454 determines that the correction has been completed for all the areas (step S407; Yes), the processing proceeds to a processing procedure in step S408. It is noted that, in the processing procedure in step S408 or in the preceding procedure thereof, the corrected 2N-channel signals may be added to the right and left to form a two-channel signal, and the two-channel signal may be transmitted to the headphones 10.

6. Others

Each of the above-described embodiments is not limited to a case in which the binaural operation processing is executed in the cloud system 20, and for example, each of the above-described embodiments can be similarly applied to a case in which the terminal device 100 acquires the head rotation information of the user (for example, the listener U) of the terminal device 100 and generates the binaural signal using the acquired head rotation information.

In addition, various programs for implementing the information processing methods (refer to, for example, FIGS. 4, 7, 10, and 13) executed by the terminal devices (as an example, the terminal devices 100, 200, 300, and 400) according to the embodiments of the present disclosure described above may be stored and distributed in a computer-readable recording medium or the like such as an optical disk, a semiconductor memory, a magnetic tape, or a flexible disk. At this time, the terminal device according to the embodiment of the present disclosure can implement the information processing method according to the embodiment of the present disclosure by installing and executing various programs in a computer.

In addition, various programs for implementing the information processing methods (refer to, for example, FIGS. 4, 7, 10, and 13) executed by the terminal devices (as an example, the terminal devices 100, 200, 300, and 400) according to the embodiments of the present disclosure described above may be stored in a disk device included in a server on a network such as the Internet and may be downloaded to a computer. In addition, functions provided by various programs for implementing the information processing methods respectively executed by the terminal devices according to the embodiments of the present disclosure may be implemented by cooperation of an OS and an application program. In this case, a portion other than the OS may be stored in a medium and distributed, or a portion other than the OS may be stored in an application server and downloaded to a computer.

Among various types of the processing described in the embodiments of the present disclosure described above, all or a part of the processing described as being performed automatically can be performed manually, or all or a part of the processing described as being performed manually can be performed automatically by a known method. In addition, the processing procedure, specific name, and information including various data and parameters illustrated in the document and the drawings can be freely and selectively changed unless otherwise specified. For example, the various types of information illustrated in each drawing are not limited to the illustrated information.

In addition, each component of the terminal devices (as an example, the terminal devices 100, 200, 300, and 400) according to the embodiments of the present disclosure described above is functionally conceptual, and is not necessarily required to be configured as illustrated in the drawings. For example, the terminal device 100 may further include a function of measuring and acquiring measurement data for calculating the head-related transfer function of the user (for example, the listener U) of the terminal device 100. Furthermore, the correction unit 154 may be functionally dispersed into a function of correcting the binaural signal and a function of transmitting the corrected binaural signal to the headphones 10.

In addition, the embodiment and the modification of the present disclosure can be appropriately combined within a range not contradicting processing contents. Furthermore, the order of each step illustrated in the flowchart according to the embodiment of the present disclosure can be changed as appropriate.

Although the embodiment and modification of the present disclosure have been described above, the technical scope of the present disclosure is not limited to the above-described embodiment and modification, and various modifications can be made without departing from the gist of the present disclosure. In addition, components of different embodiments and modifications may be appropriately combined.

7. Hardware Configuration Example

Figure 14:
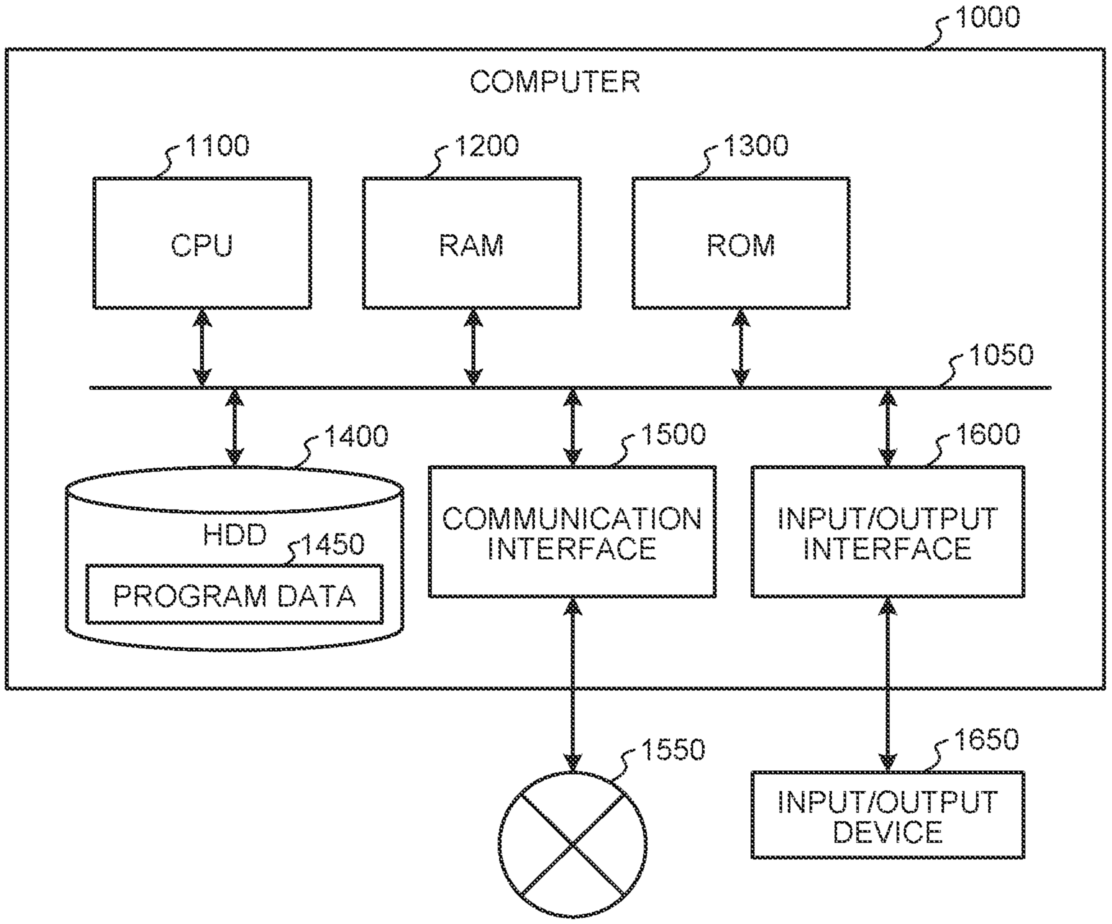
FIG. 14 is a block diagram illustrating a hardware configuration example of a computer corresponding to the terminal device according to the embodiment of the present disclosure.

A hardware configuration example of a computer corresponding to each of the terminal devices (as an example, the terminal devices 100, 200, 300, and 400) according to the embodiments of the present disclosure described above will be described with reference to FIG. 14. FIG. 14 is a block diagram illustrating a hardware configuration example of the computer corresponding to the terminal device according to the embodiment of the present disclosure. It is noted that FIG. 14 illustrates an example of a hardware configuration of the computer corresponding to the terminal device according to the embodiment of the present disclosure, and the hardware configuration is not necessarily limited to the configuration illustrated in FIG. 14.

As illustrated in FIG. 14, a computer 1000 corresponding to the terminal device (as an example, the terminal devices 100, 200, 300, and 400) according to each embodiment of the present disclosure includes a central processing unit (CPU) 1100, a random access memory (RAM) 1200, a read only memory (ROM) 1300, a hard disk drive (HDD) 1400, a communication interface 1500, and an input/output interface 1600. Respective units of the computer 1000 are connected to each other by a bus 1050.

The CPU 1100 operates based on a program stored in the ROM 1300 or the HDD 1400, and controls each unit. For example, the CPU 1100 loads the program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is started, a program dependent on the hardware of the computer 1000, and the like.

The HDD 1400 is a computer-readable recording medium that non-transiently records a program executed by the CPU 1100, data used by the program, and the like. Specifically, the HDD 1400 records program data 1450. The program data 1450 is an example of an information processing program for implementing the information processing method according to the embodiment and data used by the information processing program.

The communication interface 1500 is an interface configured to allow the computer 1000 to be connected to an external network 1550 (for example, the Internet). For example, the CPU 1100 receives data from another device or transmits data generated by the CPU 1100 to another device via the communication interface 1500.

The input/output interface 1600 is an interface configured to connect an input/output device 1650 to the computer 1000. For example, the CPU 1100 receives data from an input device such as a keyboard or a mouse via the input/output interface 1600. In addition, the CPU 1100 transmits data to an output device such as a display device, a speaker, or a printer via the input/output interface 1600. Furthermore, the input/output interface 1600 may function as a media interface configured to read a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the terminal device 100 according to the embodiment, the CPU 1100 of the computer 1000 executes the information processing program loaded on the RAM 1200 to implement various processing functions executed by each unit of the controller 150 illustrated in FIG. 3.

That is, the CPU 1100, the RAM 1200, and the like implement information processing by the terminal devices (as an example, the terminal devices 100, 200, 300, and 400) according to the embodiments of the present disclosure in cooperation with software (the information processing program loaded on the RAM 1200).

8. Conclusion

In the terminal devices (as an example, the terminal devices 100, 200, 300, and 400) according to the embodiments of the present disclosure, a first acquisition unit acquires head rotation information of a user. A transmission unit transmits the head rotation information to a cloud system. A second acquisition unit acquires content information to be presented to the user and meta information accompanying the content information, the content information being generated by predetermined processing performed by the cloud system using the head rotation information. A correction unit corrects a presentation position of a content reproduced by the content information based on the meta information. As a result, according to the embodiment of the present disclosure, it is possible to reproduce a sound field feeling aimed at by the content so as not to impair the sound field feeling as much as possible.

Furthermore, in the embodiment of the present disclosure, the predetermined processing executed in a cloud environment (for example, the cloud system 20) is binaural operation processing for generating a binauralized sound source. As a result, a processing load on the terminal device can be reduced.

Furthermore, in the embodiment of the present disclosure, the binaural operation processing is performed using a head-related transfer function. As a result, it is possible to provide a binaural signal corresponding to a listener of a content.

Furthermore, the second acquisition unit acquires, as the meta information, information of the sound source position and specific information for specifying the head rotation information used in the binaural processing. Furthermore, the correction unit specifies the head rotation information used in the binaural processing using the specific information, and corrects the sound source position using the specified head rotation information. As a result, it is possible to perform correction according to the rotation of the head of the listener before the sound of the content is output.

In addition, the second acquisition unit further acquires, as the meta information, priority information indicating a priority when the plurality of sound source positions are corrected. Furthermore, the correction unit selects, based on the priority information, the sound source position to be corrected from among the plurality of sound source positions. As a result, for example, the sound source position of the virtual sound source important in the content can be selectively corrected.

In addition, the second acquisition unit acquires the content information generated for each of the sound source positions of the plurality of virtual sound sources. The correction unit individually corrects the plurality of sound source positions. Accordingly, it is possible to correctly correct each sound source position of the virtual sound source. In addition, it is possible to prevent a situation in which an artifact of correction occurs in the sound source position of the virtual sound source that has not been corrected along with the selective correction of the sound source position of the virtual sound source.

Furthermore, the second acquisition unit acquires, as the meta information, area information for specifying an area obtained by grouping the plurality of sound source positions at a predetermined angle with respect to the user. The correction unit corrects the sound source position for each area specified by the area information. As a result, calculation costs can be kept constant regardless of the number of virtual sound sources.

Furthermore, the correction unit selects at least one of an interaural time difference and an interaural level difference based on a frequency band of the content information, and corrects the sound source position. As a result, it is possible to implement the correction of the sound source position using an error associated with the head rotation of the listener and appropriately evaluated according to the frequency band of the content.

Furthermore, the first acquisition unit acquires, as the head rotation information, a rotation matrix including acceleration applied to a head of the user (for example, the user of the terminal device 100) and an azimuth of the head. As a result, the rotation of the head of the user can be appropriately evaluated.

It is noted that the effects described in the present specification are merely illustrative or exemplary, and are not restrictive. That is, the technology of the present disclosure can exhibit other effects obvious to those skilled in the art from the description of the present specification together with or instead of the above effects.

It is noted that the technology of the present disclosure can also have the following configurations as belonging to the technical scope of the present disclosure.

(1)

An information processing device comprising:

a first acquisition unit configured to acquire head rotation information of a user;

a transmission unit configured to transmit the head rotation information to a cloud system;

a second acquisition unit configured to acquire content information to be presented to the user and meta information accompanying the content information, the content information being generated by predetermined processing performed by the cloud system using the head rotation information; and a correction unit configured to correct, based on the meta information, a presentation position of a content reproduced by the content information.

(2)

The information processing device according to (1), wherein the correction unit corrects, based on the meta information, a sound source position of a virtual sound source reproduced by the content information.

(3)

The information processing device according to (2), wherein the predetermined processing is binaural operation processing of generating a binauralized sound source.

(4)

The information processing device according to (3), wherein the binaural operation processing is performed using a head-related transfer function.

(5)

The information processing device according to (4), wherein the second acquisition unit acquires, as the meta information, information of the sound source position and specific information for specifying the head rotation information used in the binaural operation processing, and the correction unit specifies, using the specific information, the head rotation information used in the binaural operation processing, and corrects the sound source position using the specified head rotation information.

(6)

The information processing device according to (5), wherein the second acquisition unit further acquires, as the meta information, priority information indicating a priority when a plurality of the sound source positions are corrected, and the correction unit selects, based on the priority information, the sound source position to be corrected from among the plurality of sound source positions.

(7)

The information processing device according to (5), wherein the second acquisition unit acquires the content information generated for each of the sound source positions of a plurality of the virtual sound sources, and the correction unit individually corrects the plurality of sound source positions.

(8)

The information processing device according to (2), wherein the second acquisition unit acquires, as the meta information, area information for specifying an area obtained by grouping a plurality of the sound source positions at a predetermined angle with respect to the user, and the correction unit corrects the sound source position for each area specified by the area information.

(9)

The information processing device according to any one of (5) to (8), wherein the correction unit selects, based on a frequency band of the content information, at least one of an interaural time difference and an interaural level difference, and corrects the sound source position.

(10)

The information processing device according to any one of (1) to (9), wherein the first acquisition unit acquires, as the head rotation information, rotation information including at least one of acceleration applied to a head of the user and an azimuth of the head.

(11)

An information processing method, by a computer, comprising:

acquiring head rotation information of a user;

transmitting the head rotation information to a cloud system;

acquiring content information to be presented to the user and meta information accompanying the content information, the content information being generated by predetermined processing performed by the cloud system using the head rotation information; and correcting, based on the meta information, a presentation position of a content reproduced by the content information.

(12)

An information processing program causing a computer to function as a controller configured to:

acquire head rotation information of a user;

transmit the head rotation information to a cloud system;

acquire content information to be presented to the user and meta information accompanying the content information, the content information being generated by predetermined processing performed by the cloud system using the head rotation information; and correct, based on the meta information, a presentation position of a content reproduced by the content information.

(13)

An information processing system comprising:

a cloud system;

a first acquisition unit configured to acquire head rotation information of a user;

a transmission unit configured to transmit the head rotation information to the cloud system;

a second acquisition unit configured to acquire content information to be presented to the user and meta information accompanying the content information, the content information being generated by predetermined processing performed by the cloud system using the head rotation information; and a correction unit configured to correct, based on the meta information, a presentation position of a content reproduced by the content information.

REFERENCE SIGNS LIST

1 INFORMATION PROCESSING SYSTEM
10 HEADPHONES
20 CLOUD SYSTEM
100, 200, 300, 400 TERMINAL DEVICE
110, 210, 310, 410 INPUT UNIT
120, 220, 320, 420 OUTPUT UNIT
130, 230, 330, 430 COMMUNICATION UNIT
140, 240, 340, 440 STORAGE UNIT
150, 250, 350, 450 CONTROLLER
151, 251, 351, 451 FIRST ACQUISITION UNIT
152, 252, 352, 452 TRANSMISSION UNIT
153, 253, 353, 453 SECOND ACQUISITION UNIT
154, 254, 354, 454 CORRECTION UNIT

The invention claimed is:

1. An information processing device, comprising:

a processor configured to:

acquire head rotation information of a user;

transmit the head rotation information to a cloud system;

acquire content information that is presented to the user and meta information that accompanies the content information, wherein the content information is generated by a specific process which is executed by the cloud system, and the specific process is executed based on the head rotation information;

select, based on a frequency band of the content information, a correction method from a plurality of selectable correction methods; and correct, based on the meta information and the selected correction method, a presentation position of a content reproduced by the content information.

2. The information processing device according to claim 1, wherein the processor is further configured to correct, based on the meta information, a sound source position of a virtual sound source reproduced by the content information.

3. The information processing device according to claim 2, wherein the specific process is a binaural operation that generates a binauralized sound source.

4. The information processing device according to claim 3, wherein the binaural operation is executed based on a head-related transfer function.

5. The information processing device according to claim 4, wherein the processor is further configured to:

acquire, as the meta information, information of the sound source position and specific information, wherein the specific information specifies the head rotation information used in the binaural operation; processing, and specify, based on the specific information, the head rotation information used in the binaural operation; and correct the sound source position based on the specified head rotation information.

6. The information processing device according to claim 5, wherein the processor is further configured to:

acquire, as the meta information, priority information indicating a priority when a plurality of sound source positions, including the sound source position, is corrected; and select, based on the priority information, the sound source position to be corrected from the plurality of sound source positions.

7. The information processing device according to claim 5, wherein the processor is further configured to:

acquire the content information generated for each of the sound source positions of a plurality of virtual sound sources, including the virtual sound source; and correct individually the plurality of sound source positions.

8. The information processing device according to claim 5, wherein the processor is further configured to:

select, based on the frequency band of the content information, at least one of an interaural time difference and an interaural level difference; and correct the sound source position based on the selection.

9. The information processing device according to claim 2, wherein the processor is further configured to:

acquire, as the meta information, area information to specify an area obtained based on a grouping operation of a plurality of sound source positions, including the sound source position, at a specific angle with respect to the user; and correct the sound source position for each area specified by the area information.

10. The information processing device according to claim 1, wherein the processor is further configured to acquire, as the head rotation information, rotation information including at least one of acceleration applied to a head of the user or an azimuth of the head.

11. An information processing method, comprising:

acquiring head rotation information of a user;

transmitting the head rotation information to a cloud system;

acquiring content information that is presented to the user and meta information accompanying the content information, wherein the content information is generated by a specific process which is executed the cloud system, and the specific process is executed based on the head rotation information;

selecting, based on a frequency band of the content information, a correction method from a plurality of selectable correction methods; and correcting, based on the meta information and the selected correction method, a presentation position of a content reproduced by the content information.

12. A non-transitory computer-readable medium having stored thereon, computer-executable instructions which, when executed by a computer, cause the computer to execute operations, the operations comprising:

acquiring head rotation information of a user;

transmitting the head rotation information to a cloud system;

acquiring content information that is presented to the user and meta information accompanying the content information, wherein the content information is generated by a specific process which is executed by the cloud system, and the specific process is executed based on the head rotation information;

selecting, based on a frequency band of the content information, a correction method from a plurality of selectable correction methods; and correcting, based on the meta information and the selected correction method, a presentation position of a content reproduced by the content information.

13. An information processing system, comprising:

a cloud system; and a processor configured to:

acquire head rotation information of a user;

transmit the head rotation information to the cloud system;

acquire content information that is presented to the user and meta information that accompanies the content information, wherein the content information is generated by a specific process which is executed by the cloud system, and the specific process is executed based on the head rotation information;

select, based on a frequency band of the content information, a correction method from a plurality of selectable correction methods; and correct, based on the meta information and the selected correction method, a presentation position of a content reproduced by the content information.

* * * * *